US009623907B2

(12) United States Patent
Marti et al.

(10) Patent No.: US 9,623,907 B2
(45) Date of Patent: Apr. 18, 2017

(54) HAPTIC LANGUAGE THROUGH A STEERING MECHANISM

(71) Applicant: HARMAN INTERNATIONAL INDUSTRIES, INC., Stamford, CT (US)

(72) Inventors: Stefan Marti, Oakland, CA (US); Davide Di Censo, San Mateo, CA (US); Ajay Juneja, Mountain View, CA (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 244 days.

(21) Appl. No.: 14/153,886

(22) Filed: Jan. 13, 2014

(65) Prior Publication Data

US 2015/0197283 A1 Jul. 16, 2015

(51) Int. Cl.
*B62D 15/02* (2006.01)
*B62D 1/04* (2006.01)
*G08B 6/00* (2006.01)
*G06F 3/01* (2006.01)
*G01C 21/36* (2006.01)

(52) U.S. Cl.
CPC .......... *B62D 15/029* (2013.01); *B62D 1/046* (2013.01); *B62D 15/0205* (2013.01);
(Continued)

(58) Field of Classification Search
CPC .. B62D 15/029; B62D 1/046; B62D 15/0205; G06F 3/016; G01C 21/3652; G08B 6/00
(Continued)

(56) References Cited

U.S. PATENT DOCUMENTS 7,414,520 B2 * 8/2008 Meißner ................ B60K 37/06
116/36
2007/0129884 A1 6/2007 Yamada
(Continued)

FOREIGN PATENT DOCUMENTS

JP 2008269435 A 11/2008
JP 20100173514 A 8/2010

OTHER PUBLICATIONS

Boll et al, Feel Your Route: A Tactile Display for Car Navigation, Pervasive Computing, IEEE, 2011, pp. 35-42.*
(Continued)

*Primary Examiner* — Russell Frejd
(74) *Attorney, Agent, or Firm* — Artegis Law Group, LLP

(57) ABSTRACT

A system, and method for communicating navigation information to a vehicle operator through actuators in a steering mechanism for a vehicle. The steering mechanism can include multiple actuators along or in a surface a vehicle operator touches to steer the vehicle. Different numbers of actuators can be actuated under an operator's hand to communicate the severity of an upcoming turn. Alternatively, an actuator can be actuated by different amounts to communicate the severity of an upcoming turn. Proximity of an upcoming turn can be communicated by cycling actuators at different rates for different turns. By actuating actuators under an operator's left hand or the left portion of a hand, a left-hand turn can be communicated. Conversely, by actuating actuators under an operator's right hand or the right portion of a hand, a right-hand turn can be communicated.

18 Claims, 15 Drawing Sheets

(52) U.S. Cl.
CPC ......... *G01C 21/3652* (2013.01); *G06F 3/016* (2013.01); *G08B 6/00* (2013.01)

(58) Field of Classification Search
USPC .................................. 701/41; 714/701, 702
See application file for complete search history.

(56) References Cited

U.S. PATENT DOCUMENTS

| | | | |
|---|---|---|---|
| 2009/0076676 A1* | 3/2009 | Yamamoto | G06F 3/016 701/31.4 |
| 2010/0198458 A1 | 8/2010 | Buttolo et al. | |
| 2010/0282018 A1 | 11/2010 | Bazinski | |
| 2012/0126965 A1 | 5/2012 | Sanma et al. | |

OTHER PUBLICATIONS

Hwang et al, The Haptic Steering Wheel: Vibro-Tactile Based Navigation for the Driving Environment, Pervasive Computing and Communications Workshops, IEEE, 2009, pp. 163-170.*

Beruscha, Frank et al., Haptic Warning Signals at the Steering Wheel: A Literature Survey Regarding Lane Departure Warning Systems (Short Paper), Mar. 28, 2011, Haptics-e, the electronic journal of haptic research, vol. 4, No. 5, <http://www.haptics-e.org/Vol_05/he-v5n1.pdf>, pp. 1-6.

Kern, Dagmar et al., Enhancing Navigation Information with Tactile Output Embedded into the Steering Wheel, Proceedings of the 7th International Conference on Pervasive Computing, May 2009, The Open University, Buckinghamshire, United Kingdom, pp. 1-18.

Pacenotes, Nov. 9, 2013, retrieved Jan. 10, 2014, <http://en.wikipedia.org/wiki/Pacenotes>, pp. 1-3.

European Search Report for Application No. 15 15 0481, dated Sep. 9, 2015, pp. 1-8.

Haptic steering wheel and other cloud-based services showcased by AT&T researchers, AT&T Researchers—Inventing the Science Behind the Service, May 1, 2012, <http://www.research.att.com/articles/featured_stories/2012_05/201205_showcase_haptic_steering.html?fbid=_yHxO4JvAU6>, 3 pages.

* cited by examiner

HAPTIC LANGUAGE THROUGH A STEERING MECHANISM

BACKGROUND

Current electronic navigation systems in vehicles rely on audio and visual signals to communicate turn information to a vehicle operator. For example, a global positioning service (GPS) navigation device in a car may use an audio cue such as "in one hundred feet, turn left on Main Street." The audio cue may be accompanied by a visual representation of the street the car is located on, nearby streets, and an arrow at the intersection with Main Street. These navigation systems rely on the same human senses (hearing and vision) that are used by the driver to safely operate the vehicle, listen to the radio, and/or participate in a discussion.

SUMMARY

According to various embodiments, a system can include a plurality of actuators arranged relative to a steering mechanism. For example, in an automobile application, the plurality of actuators can be arranged around a steering wheel. The system can also include at least one sensor that is configured to detect the position of a vehicle operator's hand or hands on the steering mechanism. As the vehicle moves, the system can receive indications of steering inputs the vehicle operator will be required to make to the steering mechanism. For example, the system may be following a route to a destination and the operator will be required to operate the steering mechanism to complete a turn along the route. As another example, the system may detect that the road ahead includes a sharp left-hand turn and the operator will be required to operate the steering mechanism to follow the curve of the road. As yet another example, the system may detect that the vehicle is deviating from an optimal or preferred path of travel and the operator will be required to operate the steering mechanism to return to the optimal or preferred path of travel. The system includes a controller that can actuate the plurality of actuators to communicate required steering inputs to the operator appropriate for each of these situations.

According to various other embodiments, a method can determine that a vehicle is approaching a point at which an operator of the vehicle will be required to make a steering input to a steering mechanism. For example, the vehicle may be following a GPS route to a destination and the operator will be required to operate the steering mechanism to complete a turn along the route. As another example, the road ahead includes a sharp left-hand turn and the operator will be required to operate the steering mechanism to follow the curve of the road. As yet another example, the vehicle may be deviating from an optimal or preferred path of travel and the operator will be required to operate the steering mechanism to return to the optimal or preferred path of travel. The method detects the position of the vehicle operator's hand or hands on the steering mechanism. Then, the method deforms the steering mechanism in a manner that communicates the required steering inputs to the operator.

According to various other embodiments, a system can include a processing module, a navigation module, a plurality of actuators arranged on a steering mechanism of a vehicle, at least one sensor to detect the position of a vehicle operator's hand or hands on the steering mechanism, a controller configured to actuate each of the plurality of actuators, and a memory module. The memory module includes computer-readable program code that is configured to be executed on the processing module. The system includes computer-readable program code that is configured to determine the position of the vehicle relative to a position at which the operator of the vehicle will be required to apply a steering input to the steering mechanism. The system also includes computer-readable program code that is configured to cause the controller to actuate the actuators on the steering mechanism at the position(s) of the operator's hand(s) in a manner that communicates at least one aspect of the required steering input to the operator.

DETAILED DESCRIPTION

Embodiments of the invention use the human body's proprioceptive sense to communicate navigation information to a vehicle operator. The body's proprioceptive sense is the ability to sense the static or changing position and posture of body parts. For example, the human body can distinguish between small changes in position of the fingers. In various embodiments, a system may provide route guidance (e.g., turn-by-turn instructions to a destination) to a vehicle operator through a steering mechanism, such as a steering wheel, by altering the shape of the steering mechanism in a manner that causes the operator's hand to be displaced. The system can also provide information to the driver about road conditions, such as upcoming bends in the road or warnings related to inadvertent lane departure.

Figure 1:
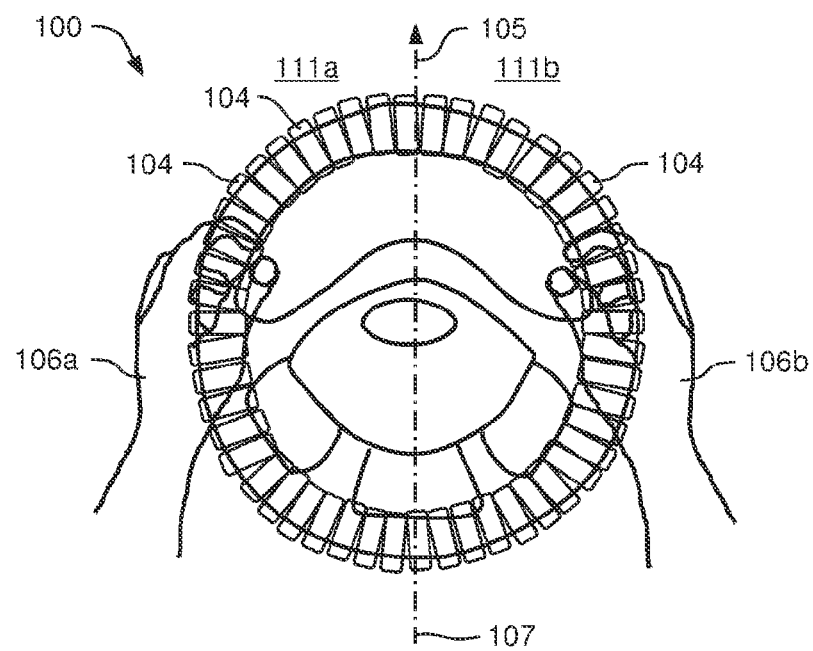
FIG. 1 illustrates an embodiment of a haptic language system in a vehicle steering wheel, in which haptic actuators (shown in exaggerated form for illustration purposes) are arranged around a circumference of the steering wheel.

FIG. 1 illustrates an embodiment of a guidance system 100 incorporated into a steering mechanism 102 (e.g., a steering wheel of a car). The guidance system 100 includes a plurality of actuators 104 arranged around a circumference of the steering wheel 102. In certain embodiments, the actuators 104 are arranged beneath an outer layer of the steering wheel 102 (e.g., an outer layer of leather, vinyl, or the like). Each of the actuators 104, when actuated, can cause the outer layer of the steering wheel 102 to locally bulge or deform outwardly by at least a minimum amount sufficient to be sensed by the driver as a change of position of their hand corresponding to a change in the shape of the steering wheel. In various embodiments, the actuators can maintain the deformation for an indefinite period of time. Put differently, the actuators can be actuated in a manner that deforms the steering mechanism and remain in the actuated state until commanded to deactivate. As shown in FIG. 1, a driver's hands 106a and 106b are holding the steering wheel 102. If actuators 104 under the driver's hands are actuated, the resulting changes to a cross-sectional dimension of the steering wheel 102 can cause the driver's fingers to be moved from a first position to a second position. As described above, the human body is capable of detecting small changes in body posture or position. Thus, the driver can detect this change in the position of their fingers on the steering wheel 102. For example, in some embodiments, this change in position may indicate an upcoming turn. By actuating actuators 104 under the driver's left hand 106a, information about a left turn can be communicated to the driver. Similarly, actuating actuators 104 under the driver's right hand 106b can communicate information about a right turn to the driver.

Figure 2:
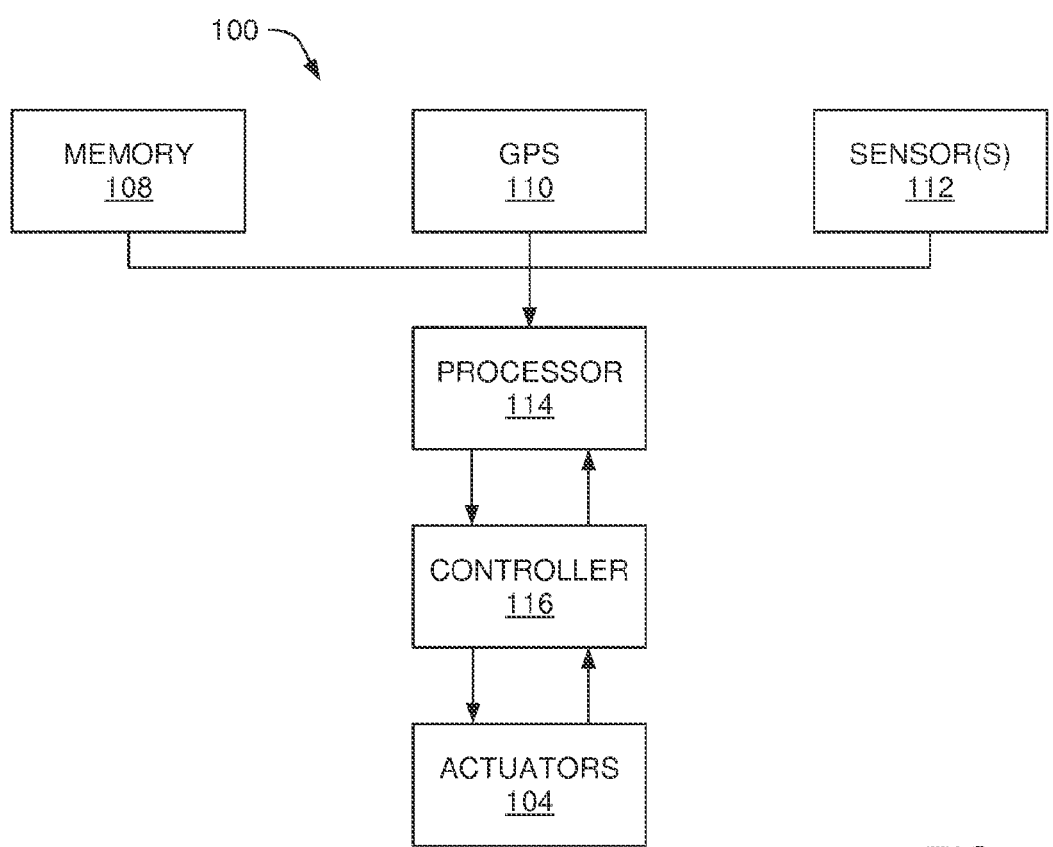
FIG. 2 is a block diagram of system components of embodiments of a haptic language system.

FIG. 2 illustrates various components that can be included in embodiments of a guidance system 100. The components of the system 100 illustrated in FIG. 2 can be connected over a stand-alone or dedicated communications network. Alternatively, the components of the system 100 can be connected for communication over a vehicle network. The guidance system 100 can include the plurality of actuators 104, which can be connected to a controller 116. The controller 116 provides control inputs to each of the actuators 104, wherein each actuator 104 can be actuated by its respective control input. In certain embodiments, the controller 116 can also receive feedback from each of the actuators 104, the feedback providing an indication to the controller 116 of the actuated position of each actuator 104. The controller 116 can be in communication with a computer processor 114. In various embodiments, the controller 116 and the computer processor 114 can be combined (and referred to collectively herein as a "controller").

As shown in FIG. 2, the processor 114 and/or controller 116 can also be in communication with a Global Positioning System (GPS) receiver 110 in the vehicle and memory 108. The memory 108 can include program instruction that are executable on the processor 114 and can also include a map of a road network. The map of the road network can include locations of road intersections, directions of turns, and severity of turns (i.e., how sharp a turn is). The GPS receiver 110 can track the location of the vehicle and can send signals (e.g., navigation signals) to the processor 114 and/or controller 116. The processor 114 and/or controller 116 can use the tracked location to identify a position on a road of the road network stored in memory 108. As the vehicle moves and approaches bends in the road or intersections where the driver is supposed to turn (e.g., when the processor is providing turn-by-turn directions to the driver), the processor 114 can send commands to the controller 116. The controller 116, in turn, can transmit control signals to appropriate actuators 104 on the steering mechanism 102.

The guidance system 100 can also include one or more sensors 112. The sensors 112 can include sensors to detect the position of the driver's hands 106a and 106b on the steering mechanism and can send signals (e.g., hand position signals) to the processor 114 and/or controller 116 such that the processor 114 and/or controller 116 know which actuators 104 are positioned beneath the driver's hands 106a and 106b. In various embodiments, the sensors 112 can include, for example, pressure sensors, capacitive sensors, optical sensors, and/or thermal sensors. In various embodiments, the actuators 104 can also act as sensors 112 wherein the pressure from an operator's hands gripping the steering mechanism 102 over particular actuators can cause displacement of the particular actuators 104 without control signals from the controller 116. As described above, in certain embodiments, the controller 116 can receive feedback from the actuators. In such embodiments, the actuators 104 can provide to the processor 114, via the controller 116, information about the positions of the user's hands on the steering mechanism (e.g., the steering wheel 102) by reporting positions of displaced actuators 104.

In various embodiments, the sensors 112 can also include a sensor that detects an orientation of the steering mechanism 102. For example, referring to FIG. 1, the guidance system 100 can include a sensor 112 that detects the position of the steering wheel 102 relative to an axis 105 aligned with the twelve o'clock and six o'clock positions on the steering mechanism 102. The steering wheel can be vertically bisected (as depicted by broken line 107) into a left side 111a and a right side 111b by the axis 105 when the wheel is in the neutral position. The axis 105 is fixed in space such that as the steering mechanism 102 rotates, actuators 104 may move to different sides 111a, 111b of the axis 105. By detecting the rotational orientation of the steering wheel 102 relative to the axis 105, the guidance system 100 can determine which actuators 104 are on the left side 111*a* of the steering wheel 102 and which actuators 104 are on the right side 111*b* of the steering wheel 102.

In various embodiments, the guidance system 100 can also include sensors 112 configured to monitor external parameters related to a vehicle. For example, the guidance system 100 can include one or more sensors that detect edges of roads or travel lanes. In certain embodiments, the guidance system 100 can also include sensors to detect other vehicles (e.g., a vehicle traveling in front of the subject vehicle or traveling in a blind spot of the subject vehicle) or pedestrians. In certain embodiments, the guidance system 100 can include sensors 112 that detect traffic signals, such as green lights, yellow lights, and red lights. In certain embodiments, the guidance system 100 can include sensors 112 that detect broadcast signals related to traffic congestion, accidents, and/or other traffic issues. In various embodiments, the actuators can be sized and spaced such that at least two actuators fall beneath each hand of a vehicle operator. For example, the actuators can be sized and spaced such that at least four actuators fall within a span of an average-sized adult human hand on the steering mechanism. As another example, the actuators can be sized such that at least four actuators fall within the span of a small adult human hand on a steering wheel (e.g., a hand size that smaller than 99% of adult hands). As described in greater detail below, multiple actuators 104 beneath an operator's hand can be simultaneously actuated to convey steering directions to the vehicle operator.

The actuators 104 can include any type of actuator that can displace and/or deform the outer layer of a steering mechanism, such as steering wheel 102. For example, the actuators can comprise solid-state memory shape alloys, which change shape when a current is applied. The actuators can also comprise hydraulically and/or pneumatically-actuated bladders that inflate to displace the outer layer of the steering mechanism. Other actuators can comprise cams, solenoids, pistons and/or levers. In various embodiments, the actuation of the actuators may cause the steering mechanism to recess instead of bulge.

In various embodiments, the guidance system 100 can be placed in one of three modes: off, assist mode, and navigation mode. In the off mode, the guidance system 100 does not provide any information to the vehicle operator. For example, referring to the steering wheel 102 in FIG. 1, the haptic actuators 104 will not activate when the system is off. In certain embodiments, the guidance system 100 may not be completely turned off. For example, critical safety information may be provided, such as communicating stopping for a red light or a detected object in the road, when the system is off.

In the assist mode, embodiments of the system can follow a vehicle's progress and provide information that may assist the vehicle operator to safely operate the vehicle. For example, in a car, the guidance system 100 can compare the vehicle's position and direction of travel to map data and provide the driver with information about upcoming curves in the road, as explained in more detail below. As another example, the guidance system 100 can monitor edges of a lane along which the vehicle is traveling and communicate steering inputs (explained in more detail below) needed to keep the vehicle from veering out of its lane. The preceding examples may be useful to a driver when visibility is limited (e.g., fog, rain, snow, and/or nighttime conditions). In various embodiments, in assist mode, the guidance system 100 can also provide information to the driver about traffic signals. For example, in various embodiments, the guidance system 100 can detect an upcoming red traffic light and communicate to the driver a stop signal (described in more detail below). Similarly, the system can detect a green light and communicate to the driver a go signal (described in more detail below). These exemplary functions in assist mode can be useful when the driver's view of a traffic signal may be impaired (e.g., when the sun is rising or setting behind a traffic signal). As yet another example, in various embodiments, the guidance system 100 can detect an object in the vehicle's path (e.g., a pedestrian, a stopped vehicle, or the like) and communicate to the driver signals to steer around the object or to stop. As yet another example, the guidance system 100 can receive broadcast information about a traffic jam ahead and signal the driver to slow down.

In various embodiments, in the various modes, the guidance system 100 can randomly actuate actuators under a vehicle operator's hand(s) to startle the operator if the operator appears to be drowsy and/or falling asleep. For example, the guidance system 100 may include one or more sensors that detect the operator's eye movements. If the system 100 detects eye behaviors that indicate that the operator is drowsy or falling asleep (e.g., the operator's eyes have been closed for more than one second or that the operator's eye gaze is fixed and not scanning the road ahead), then the system 100 can randomly actuate actuators 104 positioned under the operator's hand(s) to startle him to a more-alert state. The system 100 can also randomly actuate actuators 104 in other circumstances in which the driver is not paying attention to the road (e.g., if the system detects the driver talking on a mobile telephone for an extended period of time). For example, the sensors can include a sensor to detect telephone communications (e.g., a sensor monitoring for RF signals in the vehicle corresponding to frequencies used by mobile phones. Detecting such RF signals above a threshold level (that indicates active use of the phone) for more than a predefined period of time can trigger the system 100 to randomly actuate the actuators 104. Similarly, if the vehicle operator is using the mobile phone over a BLUETOOTH® wireless connection, the sensor may monitor the connection for activity levels that indicate active use of the phone for more than a predefined period. If the activity levels are above the threshold level for more than a predefined set of time, then the system 100 can randomly actuate the actuators 104.

In the navigation mode, the guidance system 100 can communicate information related to turns the vehicle operator should execute to follow a pre-programmed route. As described in greater detail below, embodiments of the guidance system 100 can provide information about turn direction, severity, and proximity to the driver through a steering mechanism (e.g., a steering wheel 102).

In one embodiment, the assist mode and the navigation mode can operate simultaneously. For example, the guidance system 100 can be providing turn-by-turn directions to a driver, but may interpose a warning to stop for an upcoming red light or an upcoming traffic jam.

Figure 3A:
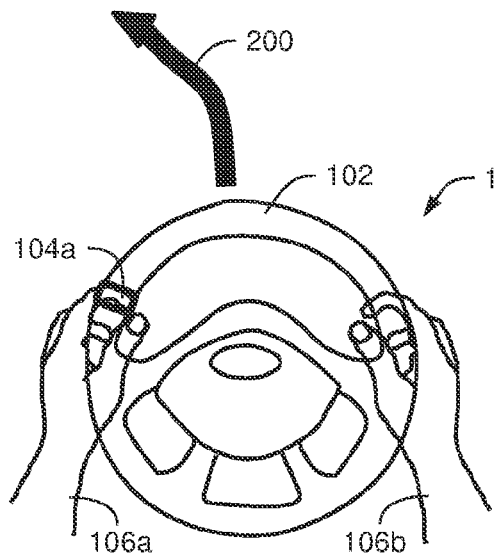
FIGS. 3A-3D illustrate an embodiment of a haptic language system in which increasing severity of an approaching turn is communicated by an increasing number of haptic actuators on a steering wheel being activated.
Figure 3B:
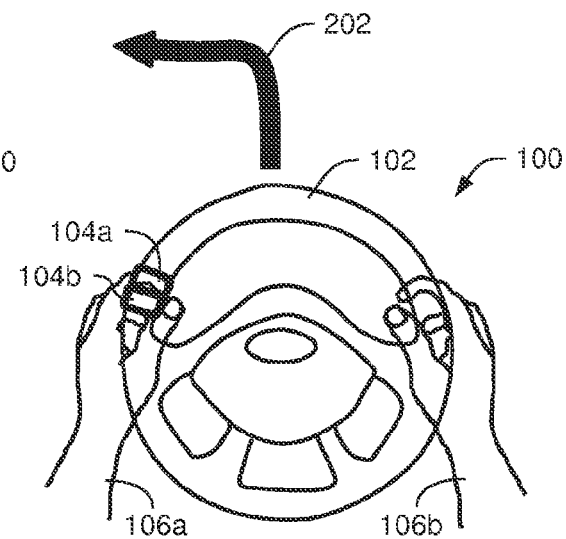
Figure 3C:
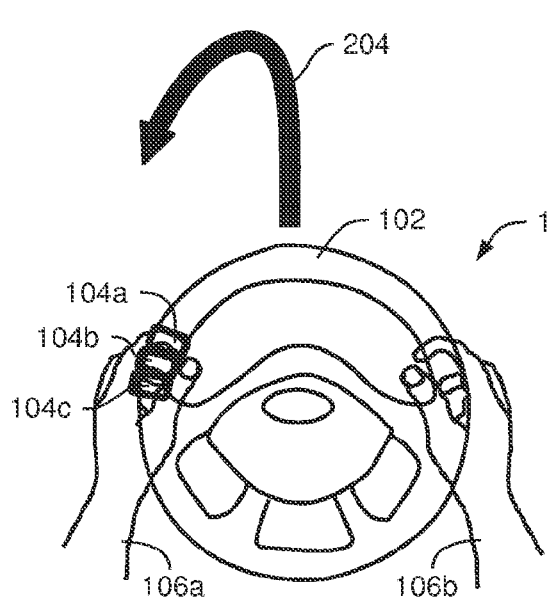
Figure 3D:
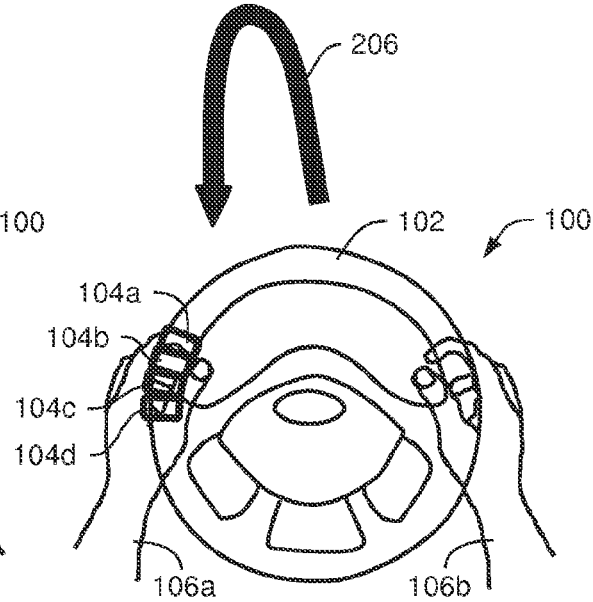

FIGS. 3A-3D illustrate an embodiment of a guidance system 100 communicating information about severity of a turn through a steering wheel 102. Referring to FIG. 3A, a driver's left hand 106*a* and right hand 106*b* are holding onto a steering wheel 102 and the vehicle is approaching a mild left-hand turn 200 in the road. The guidance system 100 can actuate a single haptic actuator 104*a* under the driver's left hand 106*a,* deforming the shape of the steering wheel at that location such that the driver's left hand 106*a* detects the deformation. For example, if the driver's hand 106*a* is curled around the steering wheel 102, the deformation of the steering wheel 102 may cause the fingers of the driver's left hand 106a to uncurl by a small amount by increasing the cross-sectional circumference of the steering mechanism 102 under the hand 106a. In various embodiments, the actuator 104a can statically deform the steering wheel to maintain the driver's fingers in the uncurled state until the turn is completed. Referring now to FIG. 3B, a sharper turn, e.g., a ninety degree turn to the left 202, may be communicated by actuating two adjacent actuators 104a and 104b. In various embodiments, the actuators 104a and 104b can statically deform the steering wheel to maintain the driver's fingers in the uncurled state until the turn is completed. Referring now to FIG. 3C, an even sharper turn, e.g., a one hundred and thirty-five degree turn to the left 204, can be communicated by actuating three adjacent actuators 104a, 104b, and 104c. In various embodiments, the actuators 104a, 104b, and 104c can statically deform the steering wheel to maintain the driver's fingers in the uncurled state until the turn is completed. Referring now to FIG. 3D, a left-hand u-turn 206 can be communicated by actuating four adjacent actuators 104a, 104b, 104c, and 104d. In various embodiments, the actuators 104a, 104b, 104c, and 104d can statically deform the steering wheel to maintain the driver's fingers in the uncurled state until the turn is completed. The exemplary severities of the turns described above (and the numbers of actuators actuated for each turn severity) are provided for illustrative purposes only. The number of actuators that actuate for a particular turn severity can vary depending on the circumstances. Furthermore, right hand turns can be communicated by actuating actuators 104 under the driver's right hand 106b in a similar manner to that described above.

In the examples above with reference to FIGS. 3A-3D, turn severity is defined by the amount of direction change through a turn. For example, a ten-degree turn to the left is less severe than a ninety-degree turn to the left. Severity can also be a function of speed. For example, a ninety-degree right hand turn may be more challenging (i.e., severe) for a driver at forty miles per hour than at five miles per hour. Thus, in various circumstances, the turn severity communicated to the driver can be a function of the amount of direction change through a turn, the speed of the vehicle entering a turn, or a combination of the two. As a result, the system 100 can communicate a turn becoming less severe as a vehicle operator slows down for a turn. For example, a vehicle may be approaching a ninety-degree left-hand turn at forty miles per hour. The system 100 may classify a ninety degree turn at forty miles per hour to be a very severe (i.e., very challenging) turn and may actuate four adjacent actuators 104a, 104b, 104c, and 104d under the driver's left hand 106a to communicate that degree of severity. As the driver slows the vehicle from forty miles per hour to ten miles per hour, the system 100 can classify the ninety degree turn at reduced speeds to be less severe (i.e., less challenging) and may deactuate some of actuators. For example, as the vehicle slows to thirty miles per hour, actuator 104d can be deactuated. Then, as the vehicle slows to twenty miles per hour, actuator 104c can be deactuated. Then, as the vehicle slows to ten miles per hour, actuator 104b can be deactuated. Thus, the system 100 can communicate to the driver the decreasing severity (e.g., decreasing challenge) of successfully completing the upcoming turn. Although the following examples describe turn severity solely as a function of an amount of direction change through a turn for purposes of simplicity, it should be understood that severity can also be a function of vehicle speed alone or vehicle speed in combination with the amount of direction change through a turn.

Figure 4A:
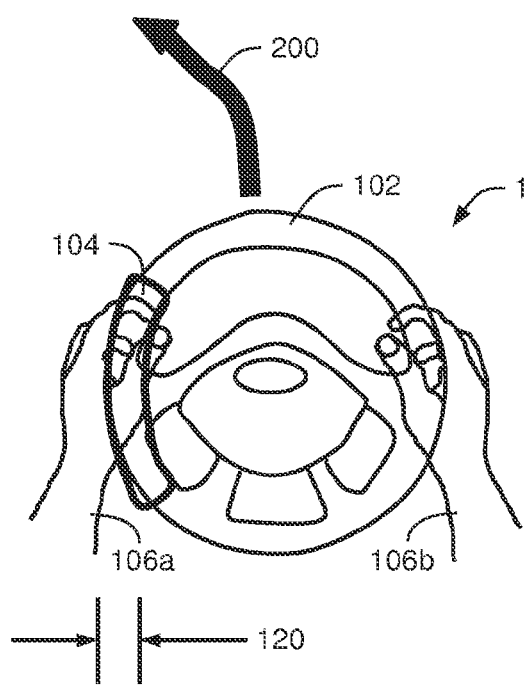
FIGS. 4A-4D illustrate an embodiment of a haptic language system in which increasing severity of an approaching turn is communicated by one or more haptic actuators being actuated to a greater degree.
Figure 4B:
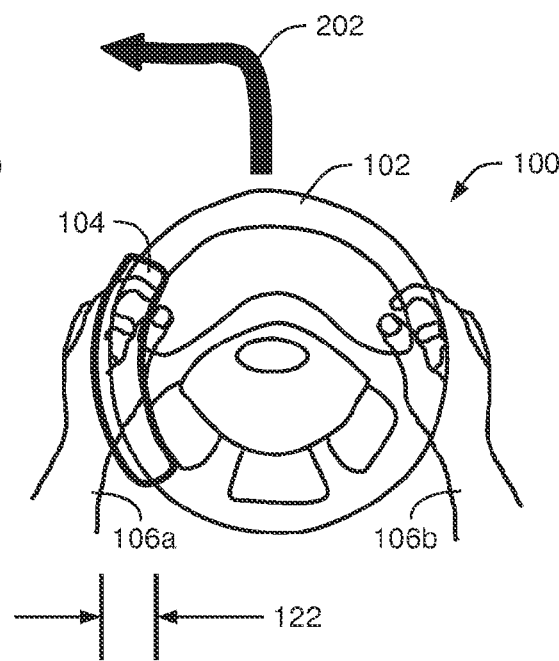
Figure 4C:
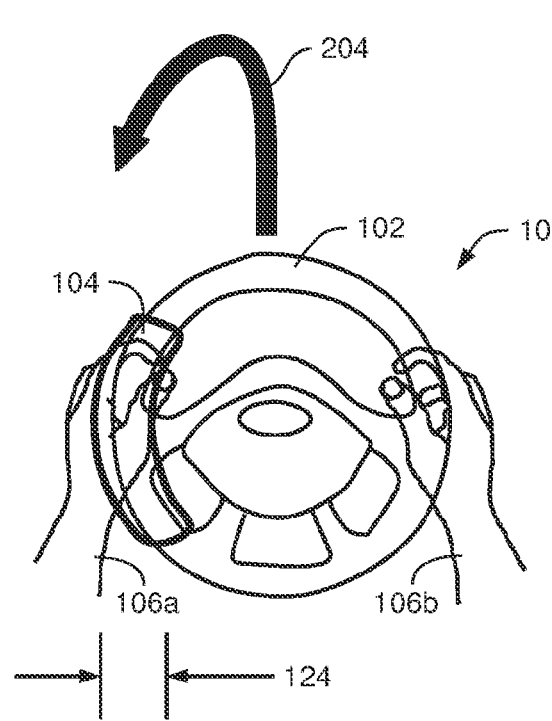
Figure 4D:
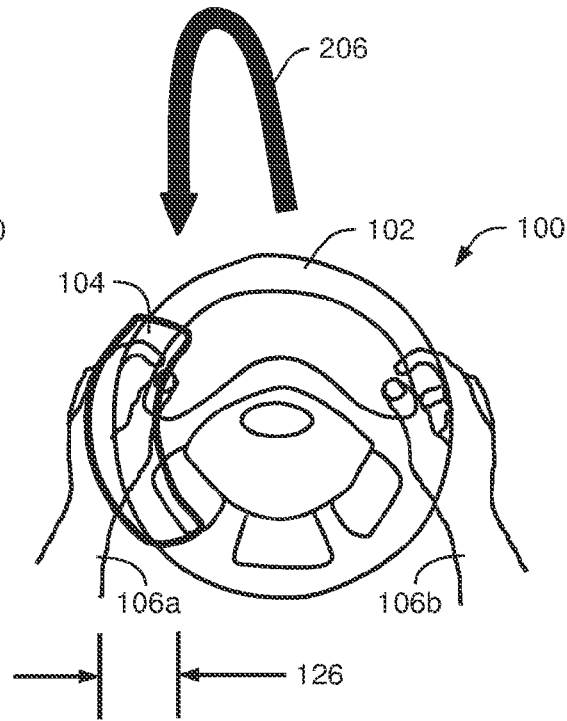

FIGS. 4A-4D illustrate another embodiment of a guidance system 100 communicating information about severity of a turn through a steering wheel 102. Referring to FIG. 4A, the guidance system 100 can actuate one or more actuators 104 by a first amount to indicate a mild left-hand turn 200 in the road. The first amount of actuation can result in the steering wheel 102 increasing in thickness 120 under the driver's left hand 106a by a first amount. For example, the thickness of the steering wheel 102 may be increased by two millimeters. Referring now to FIG. 4B, the guidance system 100 can actuate the one or more actuators 104 by a second amount to indicate a ninety degree turn to the left such that the steering wheel thickness 122 increases by a second amount that is greater than the first amount. FIGS. 4C and 4D show the actuators 104 actuating additional amounts to increase the wheel thickness 124 and 126 to communicate more-severe turns. Right hand turns can be communicated by actuating actuators 104 under the driver's right hand 106b in a similar manner to that described above.

Figures 5A, 5B:
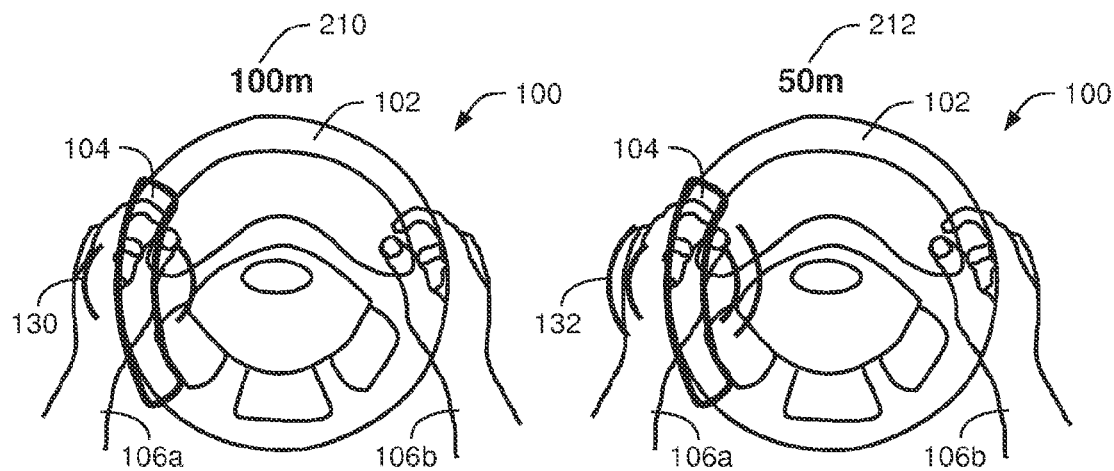
FIGS. 5A-5D illustrate an embodiment of a haptic language system in which decreasing distance to an approaching turn is communicated by one or more haptic actuators cycling at a faster rate.
Figures 5C, 5D:
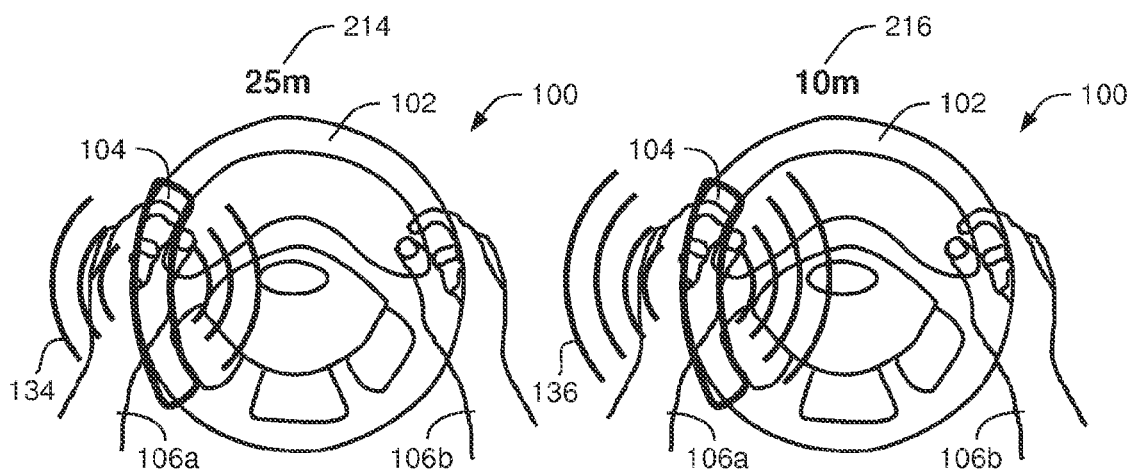

FIGS. 5A-5D illustrate an embodiment of a system communicating information about the proximity of an upcoming turn. Referring to FIG. 5A, a driver may be approaching a left-hand turn that is one hundred meters away 210. Actuators 104 under the drivers left hand 106a may pulse at a first rate 130 (e.g., at a frequency of one Hertz (Hz)). Referring now to FIG. 5B, as the driver closes to fifty meters 212 from the left-hand turn, the actuators 104 under the driver's left hand 106a can pulse at a second rate 132 that is faster than the first rate 130 (e.g., five Hz). Referring now to FIG. 5C, as the driver closes to twenty five meters 214 from the left-hand turn, the actuators 104 under the driver's left hand 106a can pulse at a third rate 134 that is faster than the second rate 132 (e.g., ten Hz). Finally, as the driver closes to ten meters 216 from the left-hand turn, the actuators 104 under the driver's left hand 106a can pulse at a fourth rate 136 (e.g., fifteen Hz) that is faster than the third rate 134.

Figure 5E:
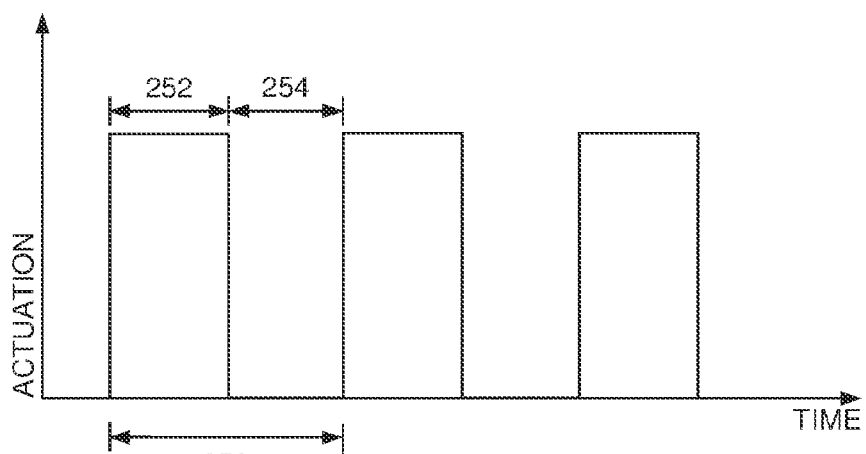
FIGS. 5E-5G illustrate different embodiments of exemplary cycling patterns for haptic actuators.
Figure 5F:
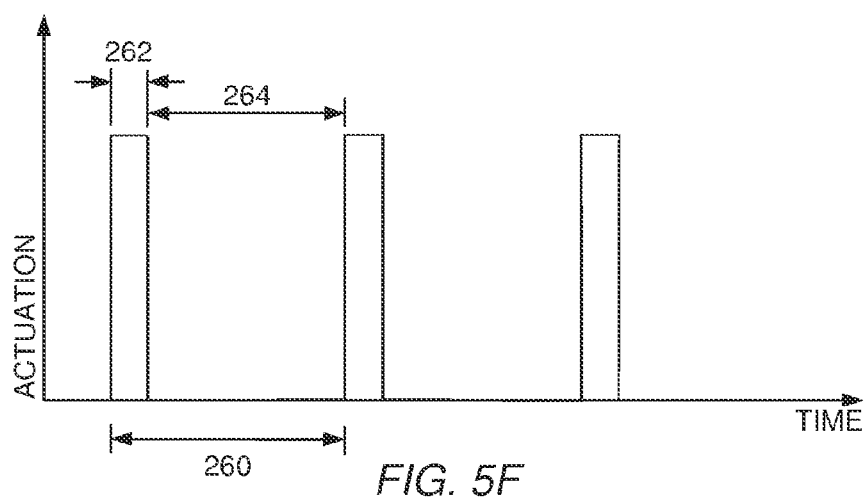
Figure 5G:
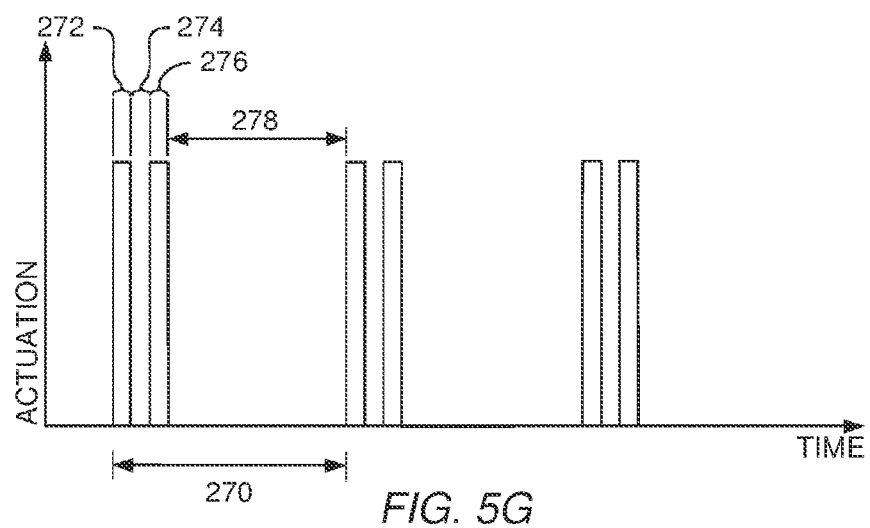

Referring now to FIGS. 5E, 5F and 5G, the actuators can be pulsed in various patterns. For example, referring to FIG. 5E, the actuators can be actuated for a first duration 252 and then deactuated for a second duration 254. As shown in FIG. 5E, the first duration 252 and the second duration 254 can be approximately equal lengths of time. A total duration of time 250 can be equal to the rate at which the actuators are pulsed. Thus, if the actuators are being pulsed at a rate of one Hz, then the total duration of time is equal to one second and durations 252 and 254 are each equal to one half of a second. As another example, referring now to FIG. 5F, the durations for actuation and deactuation of actuators can be different. FIG. 5F shows an actuation duration 262 that is approximately one tenth of a total duration time 260 and a deactuation duration 264 that is approximately nine tenths of the total duration time 260. Other time durations are possible. For example, the actuation duration 262 can equal one fourth of the total duration time 260 and the deactuation duration 264 can equal three fourths of the total duration time 260. In various embodiments, the actuators can be actuated multiple times in a total duration time. For example, referring to FIG. 5G, actuators can be actuated for a first actuation duration 272 and a second actuation duration 276 with a first deactuation duration 274 between the actuation durations 272 and 276 and a second deactuation duration 278 following the second actuation duration 276. The two actuation durations 272 and 276 can be closely grouped in time such that they both occur within the first fourth of a total duration time 270, for example.

FIGS. 6A-6D illustrate an embodiment of a process that a guidance system, such as guidance system 100, can follow to communicate turn-by-turn directions to a vehicle operator (e.g., a driver of a car). After starting (block 300), the processor 114 can store a travel route into memory 108 (block 302). For example, the driver may have entered a destination address into the GPS system 110 and the GPS system 110 calculated the travel route from the vehicle's current location to the destination address.

As the vehicle is moving, the processor 114 can query the GPS 110 to determine the current location of the vehicle (block 304) until the vehicle reaches its destination 306, at which point the navigation mode ends (block 308). Along the way to the destination, if the processor 114 determines that the vehicle is proximate to an upcoming turn in the travel route stored in memory 108 (block 310), then the processor 114 can first determine the position of the operator's hands on a steering mechanism (e.g., a driver's hands on the steering wheel 102) (block 312) and then, in combination with controller 116, communicate information about the upcoming turn through the steering mechanism (block 314). After the turn is complete (block 316), the processor 114 returns to block 304 to again determine the vehicle's location.

Figure 6A:
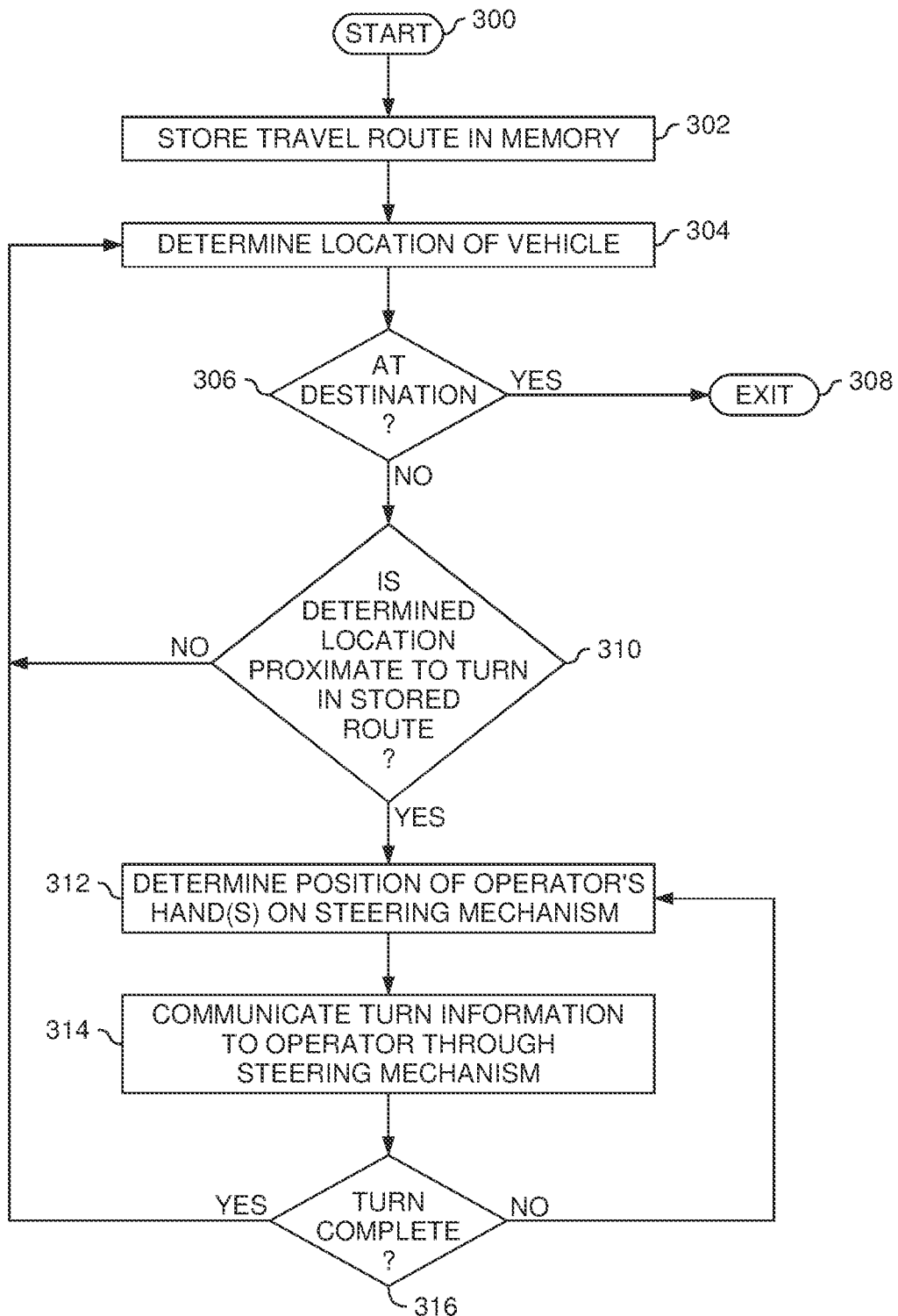
FIG. 6A is a flow chart of an exemplary method that embodiments of a haptic language system can use to communicate turn information to a driver of a vehicle.
Figure 6B:
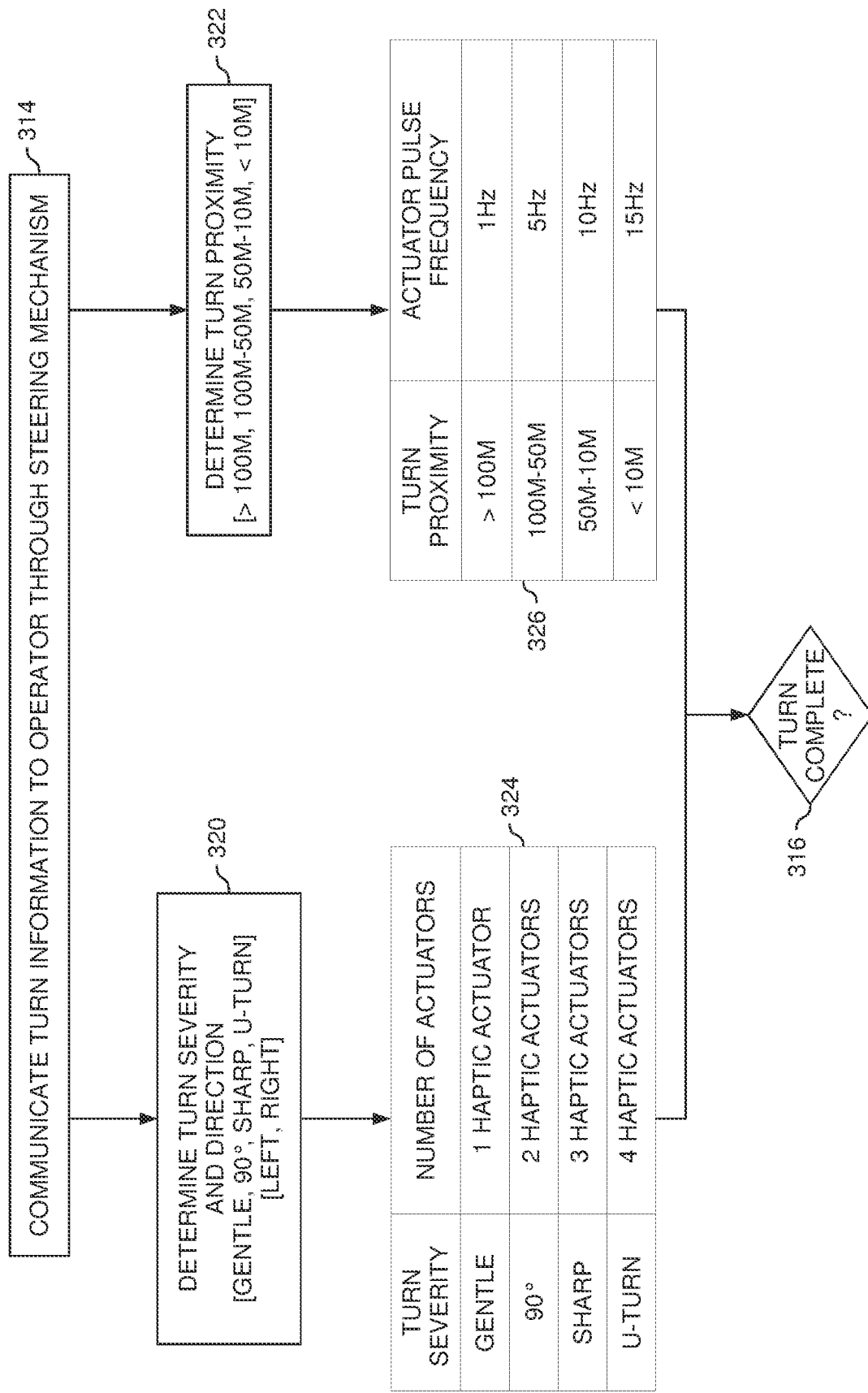
FIG. 6B is a flow chart that provides greater detail to the flow chart of FIG. 5A of a first exemplary method that embodiments of a haptic language system can use to communicate turn information to a driver of a vehicle.

FIG. 6B illustrates in greater detail how embodiments of the processor 114 and controller 116 can communicate turn information through a steering mechanism (block 314). The processor 114 can simultaneously determine the severity and direction of a turn (block 320) and determine the proximity of a turn (block 322). With respect to the severity of the turn (block 320), the processor 114 may classify a turn as one of gentle (e.g., less than ninety degrees), ninety degrees, sharp (i.e., more than ninety degrees), or a U-turn, for example. Embodiments of the guidance system 100 may include more or fewer classifications for severity of a turn. The processor 114 can also classify the turn as either a right-hand turn or a left-hand turn. Depending on the determined severity and direction of the turn, the processor 114 and controller 116 actuate a number of actuators under the driver's hand according to table 324. For example, also referring to FIG. 3A for a gentle left-hand turn 200, the processor 114 and controller 116 can actuate one actuator (e.g., actuator 104a) beneath the driver's left hand 106a. As another example, also referring to FIG. 3C, for a sharp left-hand turn 204, the processor 114 and controller 116 can actuate three actuators (e.g., actuators 104a, 104b, and 104c) beneath the driver's left hand 106.

With respect to the proximity of the turn (block 322), the system can classify the proximity as one of greater than one hundred meters, between one hundred meters and fifty meters, between fifty meters and ten meters, and less than ten meters, for example. Embodiments of the guidance system 100 may include more or fewer classifications for proximity to a turn. As a driver approaches a turn, the turn proximity falls into one of the classifications and, according to table 326, the actuators can be pulsed at a rate associated with the classification. For example, also referring to FIGS. 3A and 5A, if a driver is one hundred meters away from a gentle left-hand turn 200, then the processor 114 and controller 116 can pulse the single actuator 104a at a rate of one time per second (i.e., one Hz). Furthermore, as the vehicle approaches a turn, the proximity can shift from one classification to another. Continuing the previous example, after traveling for a few more seconds, also referring to FIG. 5B, the vehicle now may be fifty meters from the gentle left-hand turn 200 such that the processor 114 and controller 116 can pulse the single actuator 104a at a rate of five Hz. In certain embodiments, the processor 114 and controller 116 may pulse all of the actuated actuators being actuated to indicate the severity and direction of a turn. For example, also referring to FIGS. 3C and 5C, for a sharp left-hand turn that is twenty-five meters away, the processor 114 and controller 116 can pulse actuators 104a, 104b, and 104c at a rate of ten hertz. Alternatively, the processor 114 and controller 116 may pulse only a subset of the actuated actuators (e.g., only actuator 104a is pulsed). As yet another alternative, the system may pulse actuators associated with the driver's hand that is opposite the direction of the turn. For example, referring to FIGS. 5A-5D, if an upcoming turn is a right-hand turn and actuators under the driver's right hand 106b) are being actuated to indicate the direction and severity of the turn, then actuators under the driver's left hand 106a may be pulsed to indicate proximity to the turn.

As described above, as the vehicle approaches a turn, the determined turn proximity can shift from one classification in table 326 to another classification in table 326. By increasing the pulse rate of the actuators as the vehicle approaches a turn, the guidance system 100 can communicate to the driver when to turn. Similarly, in certain embodiments, the guidance system 100 can communicate a missed turn to the driver. If a driver misses an indicated turn such that the vehicle is moving further away from the missed turn, the pulse rate of the actuators can decrease. In such embodiments in which the guidance system 100 indicates a missed turn, it is advantageous for the guidance system 100 to recognize that a turn has been completed (block 316) because the vehicle will be moving away from the turn location regardless of whether the driver completed the turn or missed the turn. By determining that a turn has been completed (block 316), the guidance system 100 can stop communicating information about the completed turn to the driver, thereby not sending erroneous missed-turn communication signals that may confuse the driver.

Figure 6C:
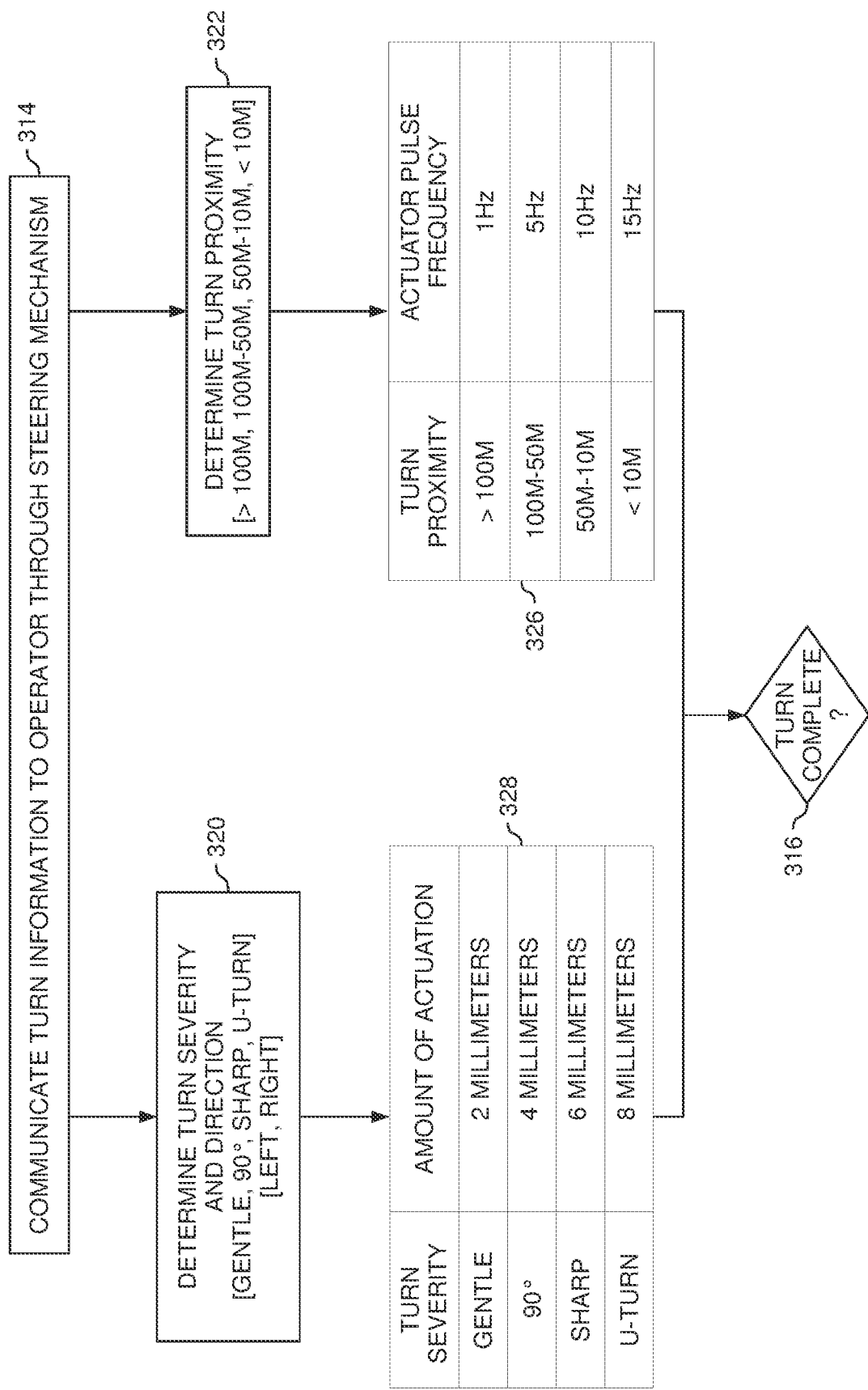
FIG. 6C is a flow chart that provides greater detail to the flow chart of FIG. 5A of a second exemplary method that embodiments of a haptic language system can use to communicate turn information to a driver of a vehicle.

FIG. 6C illustrates in greater detail another embodiment of a method of communicating turn information to a vehicle operator. The method of FIG. 6C is similar to that of FIG. 6B, except that severity and direction of turn are indicated by an amount or degree of actuation of actuators 104. As described above with respect to FIG. 6B, with respect to the severity of the turn (block 320), the guidance system 100 may classify a turn as one of gentle (e.g., less than ninety degrees), ninety degrees, sharp (i.e., more than ninety degrees), or a U-turn, for example. Referring to table 328 and again to FIG. 4A, a gentle left-hand turn 200 can be communicated by the guidance system 100 to the driver by the processor 114 and controller 116 actuating one or more actuators 104 under the driver's left hand 106a by two millimeters. Similarly, referring again to FIG. 4B, a ninety degree left-hand turn can be communicated by the guidance system 100 to the driver by the processor 114 and controller 116 actuating the one or more actuators 104 under the driver's left hand 106a by four millimeters. Referring again to FIG. 4C, a sharp left-hand turn 204 can be communicated by the guidance system 100 to the driver by the processor 114 and controller 116 actuating the one or more actuators 104 under the driver's left hand 106a by six millimeters. Finally, referring again to FIG. 4D, a left-hand u-turn 206 can be communicated by the guidance system 100 to the driver by the processor 114 and controller 116 actuating the one or more actuators 104 under the driver's left hand 106a by eight millimeters.

Figure 6D:
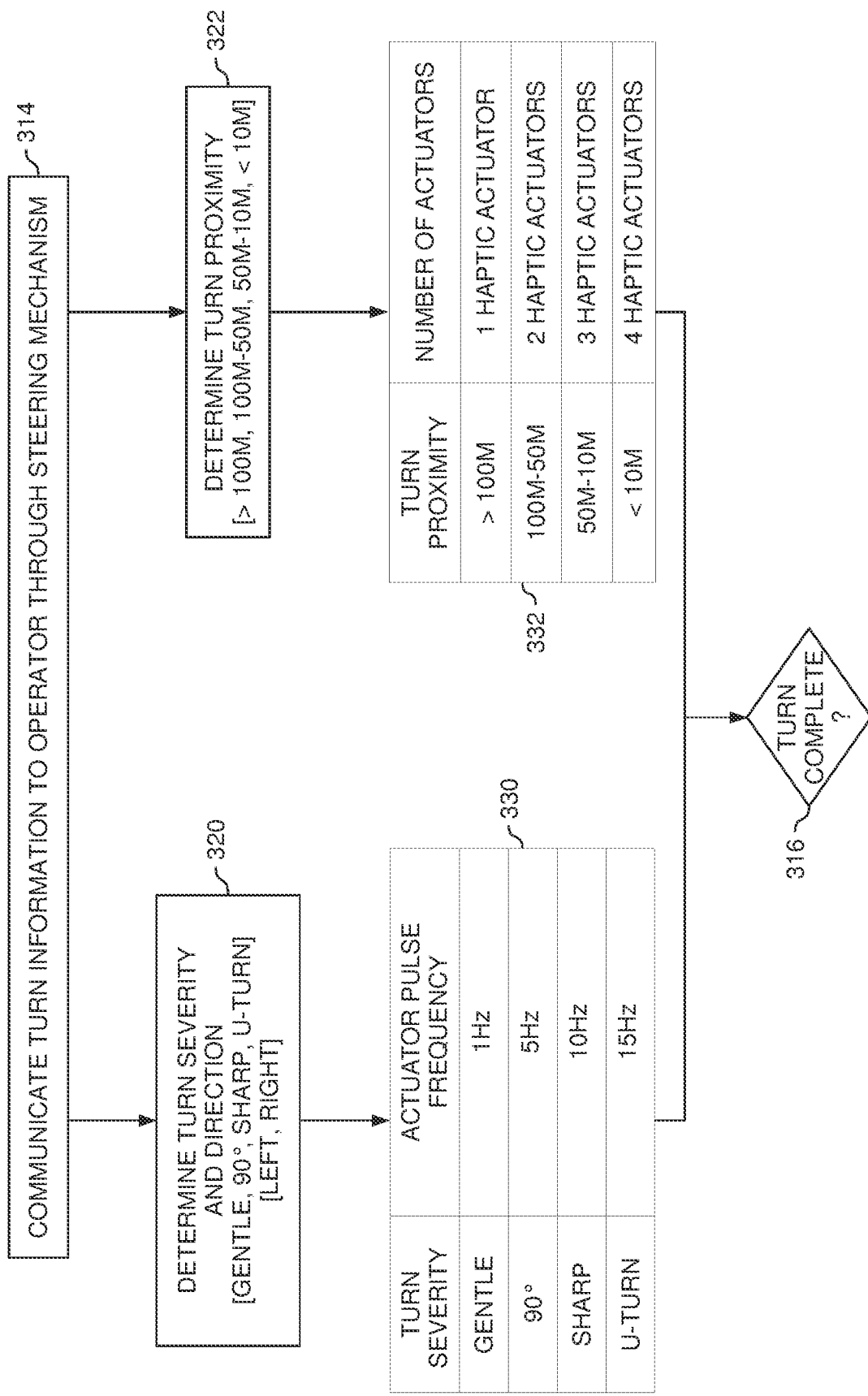
FIG. 6D is a flow chart that provides greater detail to the flow chart of FIG. 5A of a third exemplary method that embodiments of a haptic language system can use to communicate turn information to a driver of a vehicle.

In various other embodiments, turn direction and severity can be communicated by cycling actuators and turn proximity can be communicated by actuating (or deactivating) actuators. Referring now to FIG. 6D, the turn severity and direction are indicated by pulses. For example, table 330 shows that a turn determined to be gentle would be communicated with a one hertz cycling beneath the driver's hand that corresponds to the direction of the turn. Similarly, a sharp turn would be communicated with a ten hertz cycling beneath the driver's hand. Proximity to a turn can be communicated by actuating sequential actuators. For example, according to table 332, when a turn is more than one hundred meters away, one actuator can be raised. As the vehicle closes within one hundred meters from the turn, according to table 332, a second actuator can be actuated. As the vehicle closes further to within fifty meters, according to table 332, a third actuator can be actuated. Finally, as the vehicle closes within ten meters of the turn, according to table 332, a fourth actuator can be actuated.

In certain embodiments, such as the embodiments described above in which actuators pulse to indicate turn severity and/or turn proximity, actuators may pulse between a first actuated amount and a second actuated amount such that the steering mechanism beneath the operator's hand remains in a deformed state while the actuators pulse. For example, again referring to FIG. 6B, each of the four actuators, when actuated, may deform the outer surface of the steering mechanism by forming a five millimeter bulge. The pulsing may then vary the size of the bulge between three millimeters and seven millimeters, for example. As a result, the steering mechanism remains deformed (i.e., the bulge does not completely go away) while the actuator is pulsing. As another example, again referring to FIG. 6C, the actuator(s) causing the deformation of the steering mechanism by varying amounts may be pulsed by an amount that varies around a baseline amount of deformation. For example, according to table 328, a gentle turn can be communicated to the vehicle operator by actuating the actuator(s) by two millimeters (i.e., a baseline amount of actuation). Accordingly, the system may pulse the actuator(s) around the baseline of two millimeters between one millimeter and three millimeters to communicate the proximity of the turn. Similarly, according to table 328, a ninety degree turn can be communicated to the vehicle operator by actuating the actuator(s) by four millimeters (i.e., a baseline amount of actuation). Accordingly, the system can pulse the actuator(s) around the baseline amount of four millimeters between three millimeters and five millimeters to communicate the proximity of the turn.

In various other embodiments, actuators may be progressively deactivated to indicate proximity to a turn. For example, when the vehicle is more than one hundred meters from a turn, the processor 114 and controller 116 can actuate four actuators to indicate that the turn is approaching. As the vehicle closes to within one hundred meters of the turn, the processor 114 and controller 116 can deactuate one of the four actuators, leaving three actuated actuators. As the vehicle closes to within fifty meters of the turn, the processor 114 and controller 116 can deactuate one of the remaining three actuators, leaving two actuated actuators. As the vehicle closes within ten meters of the turn, the processor 114 and controller 116 can deactuate one of the two remaining actuators, leaving one actuator actuated. As the vehicle approaches the turn (e.g., reaches the point where the vehicle must be steered into the turn) the processor 114 and controller 116 can deactuate the remaining actuator.

Figure 7A:
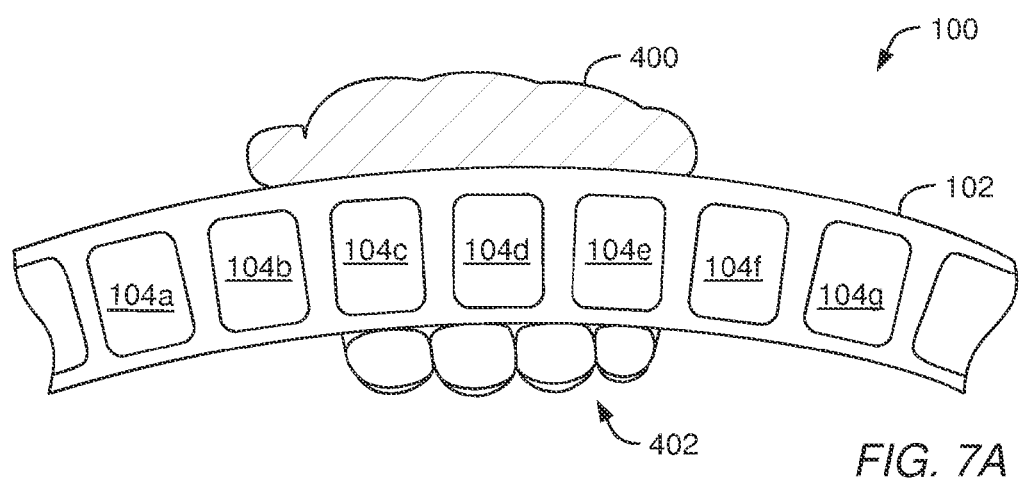
FIGS. 7A-7C illustrate an embodiment of a haptic language system for use in instances when a vehicle operator only has a single hand on the steering mechanism.
Figure 7B:
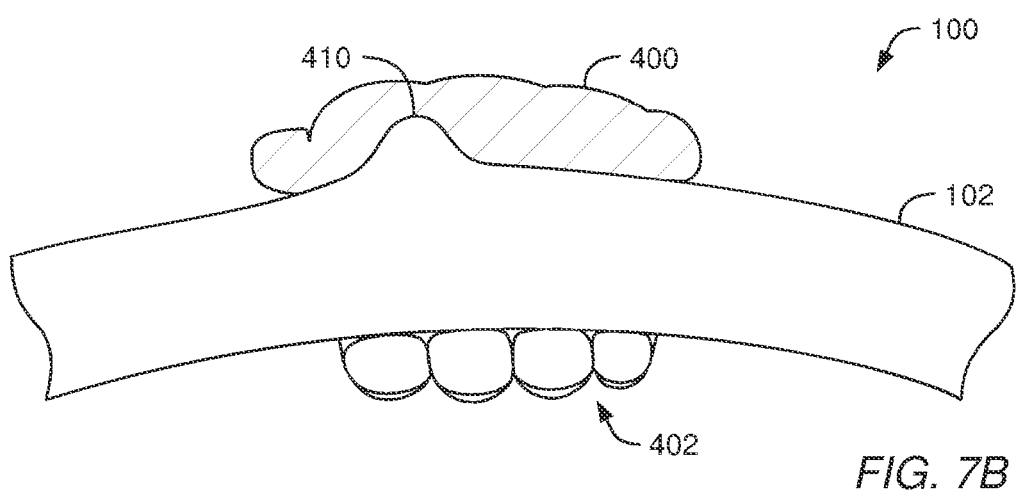
Figure 7C:
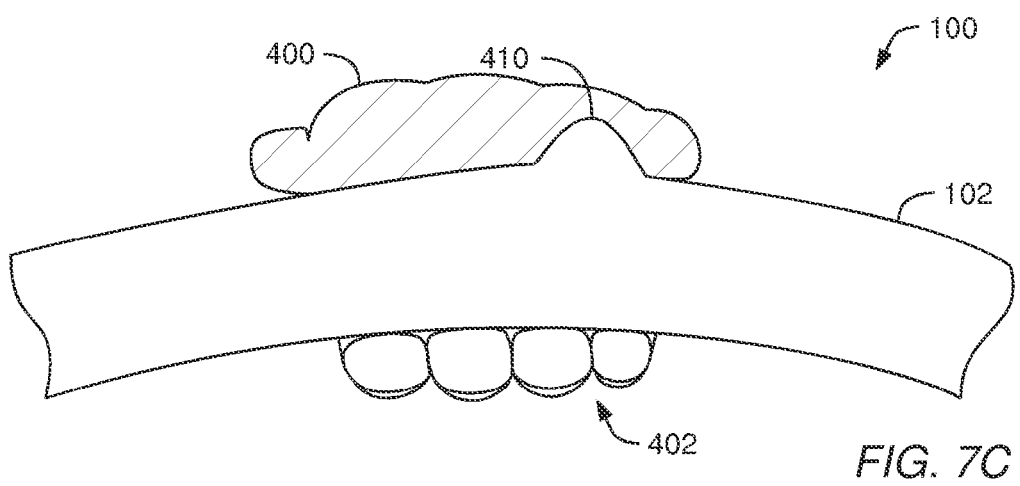

In the embodiments described above, direction of a turn can be communicated to a driver by actuating actuators under one hand of the driver and not the other while both hands are on the wheel. This kind of differential tactile feedback may provide an intuitive mode of communicating with the driver. Oftentimes, however, drivers will steer a vehicle, such as a car, with only a single hand on the wheel. For example, drivers will often use just their left hand to steer the vehicle while using their right hand to shift gears, adjust the radio, or the like. Embodiments are contemplated for communicating with the driver in this driving configuration. FIGS. 7A-7C illustrate an operation of the guidance system 100 in which information can be communicated to a driver who is using a single hand to steer the vehicle. FIG. 7A illustrates a portion of the steering wheel 102 with a plurality of actuators 104a-104g arranged therein. The cross-section of the palm 400 of a user's hand is shown resting on an outer circumference of the steering wheel 102 with the fingers 402 curled around to an inner circumference of the steering wheel 102. In various embodiments, the actuators 104 can be sized so that each of a driver's hands will span at least two actuators. As shown in FIG. 7B, a left-hand turn can be communicated to the driver by actuating one or more actuators under the left side of the palm 400 of the driver's hand. For example, the processor 114 and controller 116 can actuate actuators 104b and 104c to cause a bulge 410 of the outer circumference of the steering wheel 102. The driver can feel the bulge 410 pushing into the left side of the palm 400 of their hand to know that a left turn is approaching. Similarly, a right-hand turn can be communicated to the driver by the processor 114 and controller 116 actuating actuators 104e and 104f and thereby causing a bulge 410 under the right side of the palm 400 of the hand. As described above, the actuators can be actuated to varying degrees of thickness to indicate the severity of the turn and can be pulsed to indicate proximity to the turn. Alternatively, the actuators can be pulsed at varying rates to indicate the severity of the turn and can be actuated to varying degrees of thickness to indicate the severity of the turn. In alternative embodiments, the same navigational messages may be communicated to the vehicle operator by operating the actuators 104 to displace the inner circumference of the steering wheel 102 such that the fingers 402 of the driver are displaced. In still other embodiments, a combination of both inner and outer circumferential displacement can be used.

Figure 8A:
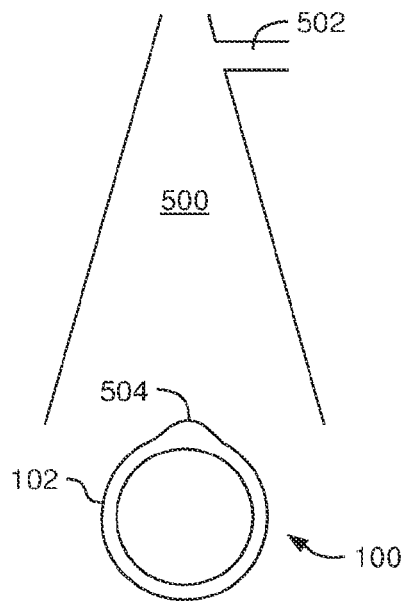
FIGS. 8A-8D illustrate an embodiment of a haptic language system in which haptic actuators visibly distort a steering wheel and the distortions provide a visible indicated bearing to a turn.
Figure 8B:
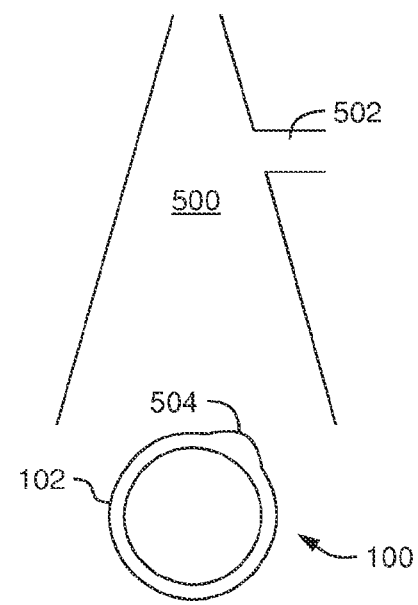
Figure 8C:
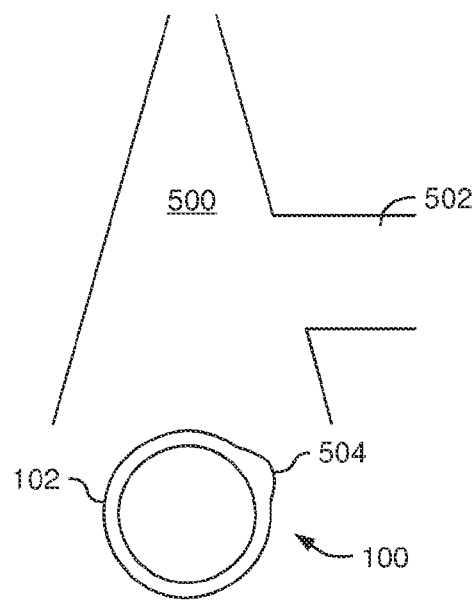
Figure 8D:
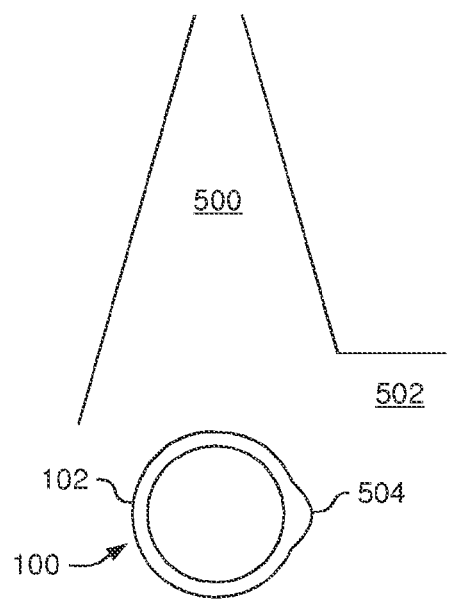

Referring now to FIGS. 8A-8D, in various embodiments, the actuators in the steering wheel can also communicate visual information to a driver about an upcoming turn. As shown in FIG. 8A, a vehicle can be driving along a first road 500 with a right-hand turn onto a second road 502 off in the distance. The haptic actuators in a steering wheel 102 of the vehicle can be actuated to form a bulge 504 that approximately indicates a bearing to the turn onto road 502. For example, as shown in FIG. 8A, the road 502 is off in the distance such that it appears to be oriented almost at twelve o'clock relative to the direction of the vehicle. As a result, the bulge 504 on the steering wheel 102 can be located at or near a twelve o'clock (i.e., vertical) position on the steering wheel 102. In certain embodiments, the bulge 504 may begin to move the right of the twelve o'clock position to indicate that the upcoming turn is a right-hand turn. As shown in FIGS. 8B-8D, as the vehicle approaches the second road 502, the bearing to the road 502 will shift from the twelve o'clock position shown in FIG. 8A towards a three o'clock position shown in FIG. 8D. As the bearing to the road 504 shifts towards three o'clock, the actuators in the steering wheel 102 can actuate to move the visible bulge 504 toward a three o'clock position on the steering wheel 102. Thus, the driver may be presented with a visible indication of the location of the road 502. In various circumstances, as the vehicle approaches the turn, the vehicle operator may have to turn the steering wheel 102 to follow a bend in the road, avoid an obstacle, and/or change lanes, for example. In such circumstances, as the steering wheel 102 is turned, the bulge 504 can move relative to the steering wheel 102 such that the bulge 504 remains stationary (i.e., at the same clock position) to continue to indicate the bearing to the turn.

Figure 9A:
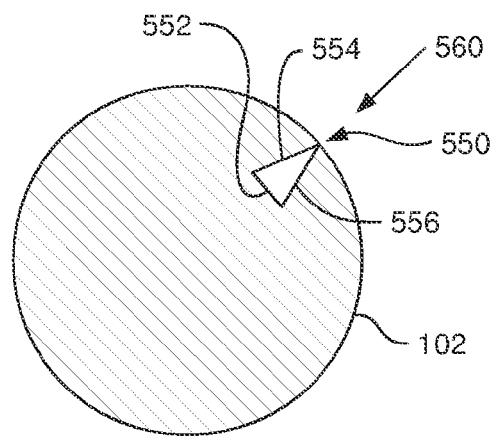
FIGS. 9A and 9B illustrate a cross-sectional side view of a steering wheel in which the steering wheel includes a section that is revealed when a haptic actuator distorts the shape of the steering wheel.
Figure 9B:
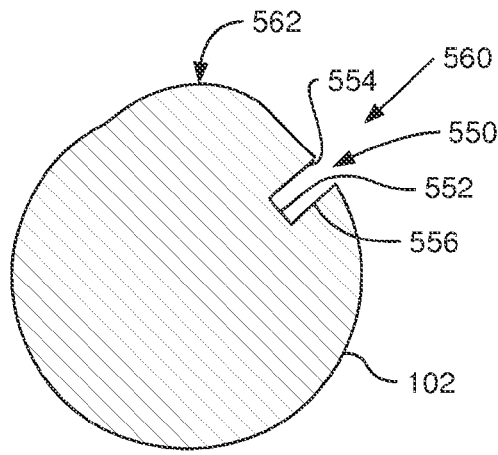
Figure 9C:
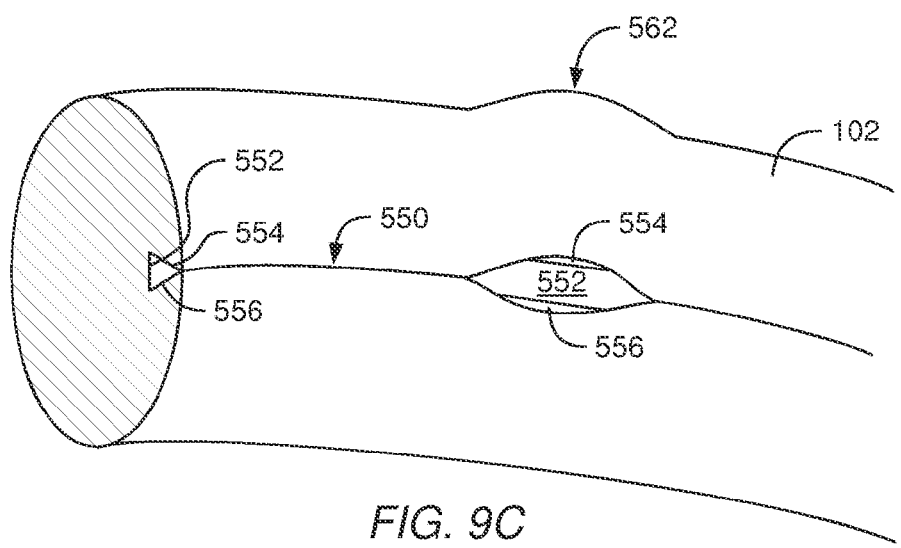
FIG. 9C is a cross-sectional perspective view of a portion of the steering wheel of FIGS. 9A and 9B, in which the section is revealed when the haptic actuator distorts the shape of the steering wheel.

In various embodiments, the displacement (e.g., bulge) of the steering wheel by actuation of the actuators may be too small to be visibly noticeable. Referring now to FIGS. 9A through 9C, a steering mechanism, such as steering wheel 102, can include a visible indicator that makes the deformation of the steering mechanism more obvious to the vehicle operator. FIG. 9A shows a cross-sectional side view of a steering mechanism, such as steering wheel 102, in a configuration in which actuators (omitted for clarity) are not actuated. The steering wheel 102 may have a generally circular cross-sectional shape. The steering wheel 102 can include a triangular cavity 550 defined by walls 552, 554, and 556. Wall 552 forms a base of the triangular cavity 550 with walls 554 and 556 forming the sides of the triangular cavity 550. Wall 552 can be connected to each of walls 554 and 556. As shown in FIG. 9A, when the steering wheel 102 is not deformed by actuators, the walls 554 and 556 can touch but they are not connected. Referring now to FIGS. 9B and 9C, when the processor 114 and controller 116 actuates certain actuators, thereby locally deforming the steering wheel 102 (e.g., forming bulge 562 on the steering wheel), walls 554 and 556 of the cavity 550 at the location of the actuated actuators can be spread apart such that walls 552, 554, and 556 are revealed to the operator (arrow 560 represents the direction of the operator's view). As shown in FIG. 9C, the walls 554 and 556 spread apart in the vicinity of the bulge 562 caused by the actuators but can continue to touch. In various embodiments, the walls 552, 554, and 556 can be a contrasting color to the outer surface of the steering wheel. For example, if the steering wheel is black, then the walls 552, 554, and 556 may be white, yellow, or red. In various other embodiments, the walls 552, 554, and 556 may include a luminescent paint that glows in the dark such that it is visible at night. In various other embodiments, the cavity 550 can include a light source (e.g., a light emitting diode) that is only visible to the driver when the actuators are actuated.

Figure 10A:
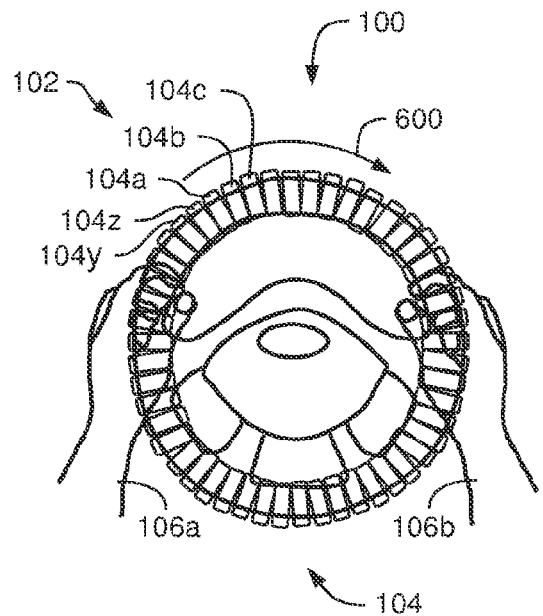
FIGS. 10A-10D illustrate an embodiment of a haptic language system in which haptic actuators sequentially actuate to indicate direction of a turn and/or proximity to a turn.

Referring now to FIGS. 10A-10D, in various embodiments, a plurality of actuators 104 arranged around a steering mechanism, such as steering wheel 102, can be sequentially actuated to communicate upcoming turns, starting, and stopping, for example. Referring to FIG. 10A, a right-hand turn can be communicated to the vehicle operator by the processor 114 and controller 116 sequentially actuating actuators in a clockwise direction (indicated by the direction of arrow 600). As a result, a deformation of the steering wheel caused by the actuators will move around the steering wheel 102 in a clockwise direction thereby producing a propagating pulse that moves in the direction of the turn. For example, the actuators 104 can be sequentially actuated by first actuating actuator 104a, then actuating actuator 104b, then actuating actuator 104c, and so on until the last actuator 104z has been actuated. The actuators 104 can continue actuating sequentially until the turn is completed. If the actuators 104 are sized such that at least two actuators 104 rest beneath each of the driver's hands 106a and 106b, then the driver will be able to feel the direction of travel of the deformation of the steering wheel, communicating the turn information.

Figure 10B:
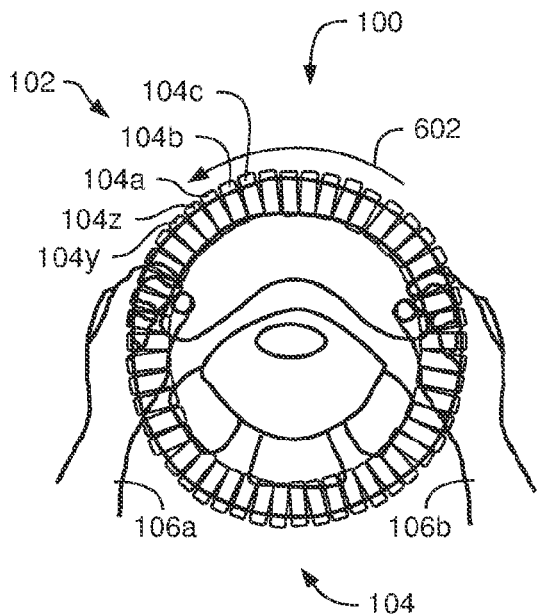

FIG. 10B illustrates the embodiment of FIG. 10A in which a left-hand turn is communicated to the driver by reversing the sequential order in which actuators are actuated such that the deformation of the steering wheel 102 travels in a counter-clockwise direction (in the direction of arrow 602). For example, actuator 104c can actuate first followed by actuator 104b followed by actuator 104a and so on.

In various embodiments, the speed of sequential actuation can be changed to indicate proximity to a turn. For example, the actuators 104 may each sequentially actuate one time every five seconds to indicate a turn that is over one hundred meters away. When the turn is less than ten meters away, the actuators may each sequentially actuate one time every second. Turn severity can be communicated to the driver by the degree to which each actuator 104 is sequentially actuated. For example, to communicate a gentle turn, each actuator 104 may sequentially actuate two millimeters. For a sharp turn (e.g., a turn of greater than ninety degrees), each actuator 104 may sequentially actuate six millimeters.

Figure 10C:
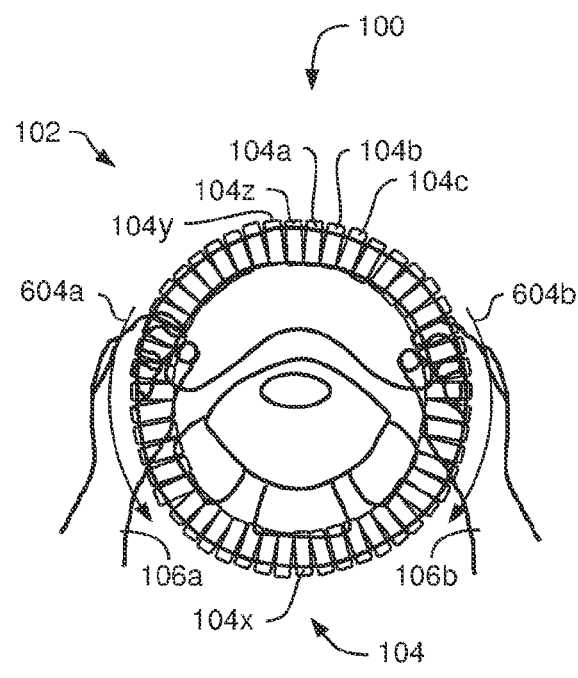

Embodiments of the guidance system 100 can also communicate stop and go commands to a driver by sequentially actuating actuators. Referring to FIG. 10C, a "stop" instruction can be communicated to the driver by sequentially actuating actuators 104 from the top of the steering wheel 102 to the bottom of the steering wheel 102 along both the left side 111a and the right side 111a of the steering wheel 102. For example, actuator 104a, at the top of the steering wheel 102, can be actuated first. Then, actuators 104b and 104z can be simultaneously actuated. Then, actuators 104c and 104y can be simultaneously actuated. The actuators 104 can continue to sequentially actuate down the left and right sides of the steering wheel 102 until the two deformation paths converge at actuator 104x. Then, the sequential actuation can begin again at actuator 104a. As a result, a first deformation moves down the left side of the steering wheel 102 in the direction of arrow 604a and a second deformation moves down the right side of the steering wheel 102 in the direction of arrow 604b. The urgency of stopping can be communicated to the driver by the rate of sequential actuation. For example, if the system detects a red light in the distance or receives broadcast information related to an upcoming traffic jam (for which the vehicle should start slowing down to come to a stop), the system may communicate the stop by sequentially actuating each actuator 104 one time every three seconds. By contrast, if the guidance system 100 detects another vehicle pulling out in front of the subject vehicle (for which the subject vehicle should rapidly decelerate), the system may communicate the stop by sequentially actuating each actuator 104 once every half second. Alternatively, or additionally, the urgency of stopping can be communicated to the driver by changing the degree to which each actuator is actuated. For example, the distant red light may be communicated by actuating each actuator by two millimeters whereas the rapid stop can be communicated by actuating each by ten millimeters.

Figure 10D:
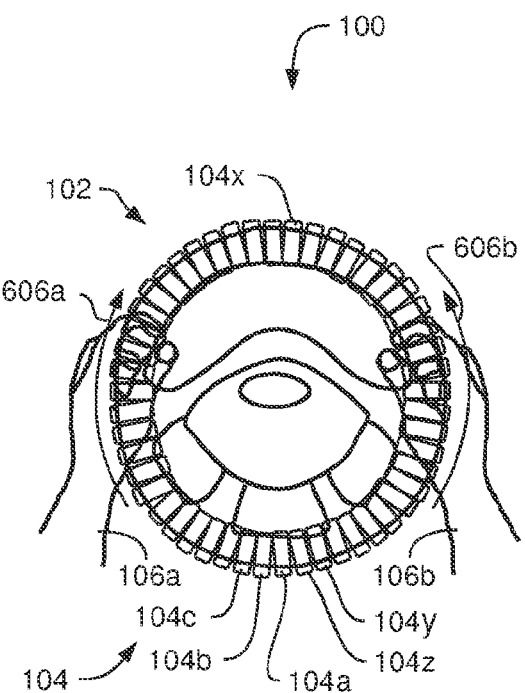

Referring now to FIG. 10D, "start" can be communicated to a driver by sequentially actuating actuators 104 from the bottom of the steering wheel 102 to the top. For example, actuator 104a can be actuated first. Then, actuators 104b and 104z can be simultaneously actuated. Then, actuators 104c and 104y can be simultaneously actuated. The actuators 104 can continue to sequentially actuate down the left and right sides of the steering wheel 102 until deformation paths converge at actuator 104*x*. Then, the sequential actuation can begin again at actuator 104*a*. As a result, a first deformation moves up the left side of the steering wheel 102 in the direction of arrow 606*a* and a second deformation moves up the right side of the steering wheel 102 in the direction of arrow 606*b*.

Embodiments of a haptic communication system are not limited to a steering wheel in a car. In various embodiments, the system can also include haptic actuators arranged in the driver's seat, in a gear shift knob, in a seat belt, or the like.

Figure 11A:
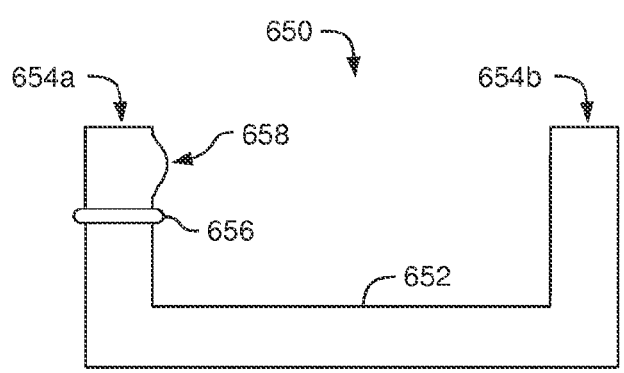
FIGS. 11A-C illustrate an embodiment of a haptic language system incorporated into an aircraft control yoke and providing guidance for an instrument landing system (ILS) approach.
Figure 11B:
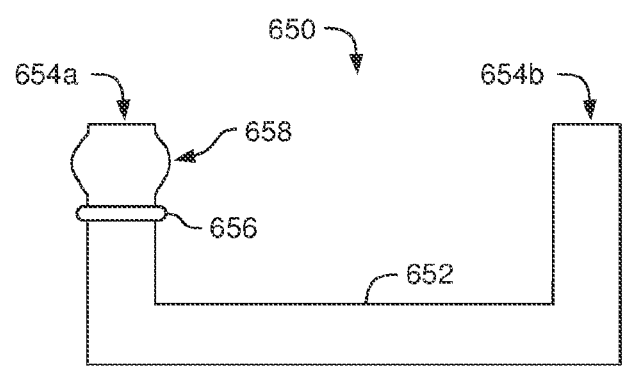
Figure 11C:
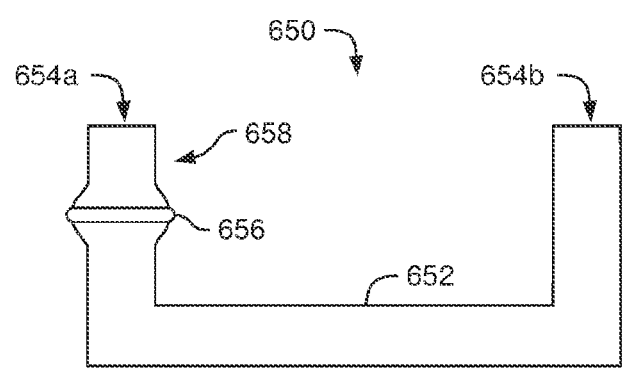

Embodiments of a haptic communication system can be arranged in vehicles other than automobiles. Referring now to FIGS. 11A-11C, a haptic communication system can be included in an aircraft. FIGS. 11A-11C illustrate an aircraft control yoke 650 that can control pitch and roll of an aircraft. The yoke 650 can include a right-side handle 654*b* and a left-side handle 654*a* that are connected by a cross member 652. A pilot can hold onto the left-side handle 654*a* and the right-side handle 654*b* and can turn the yoke 650 to the left and the right to roll an aircraft to the left and right, respectively. The pilot can also pull on the yoke (in a direction out of the page) to pitch the nose of the aircraft up and push on the yoke (in a direction into the page) to pitch the nose of the aircraft down.

Figure 12A:
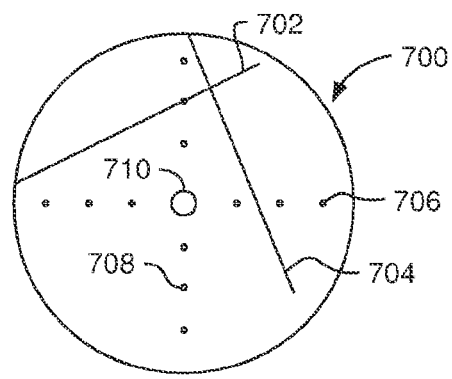
FIGS. 12A-12C illustrate an exemplary ILS instrument of an aircraft cockpit panel.
Figure 12B:
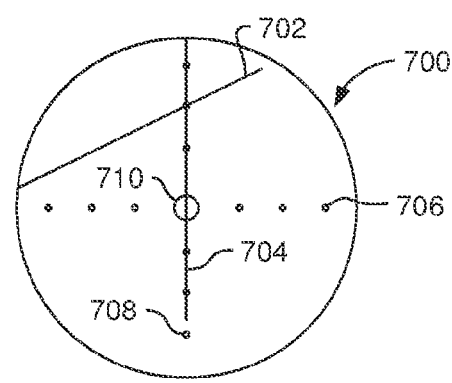
Figure 12C:
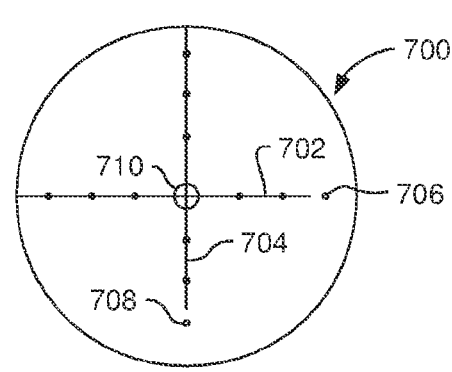
Figure 13A:
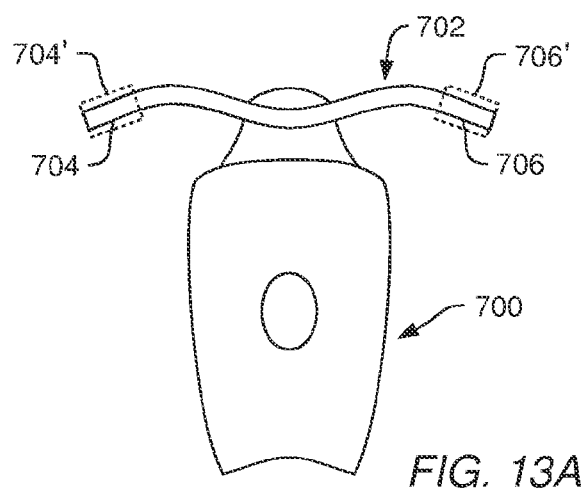
FIGS. 13A-13E illustrate an embodiment of a haptic language system incorporated into handlebars for a motorcycle.
Figure 13B:
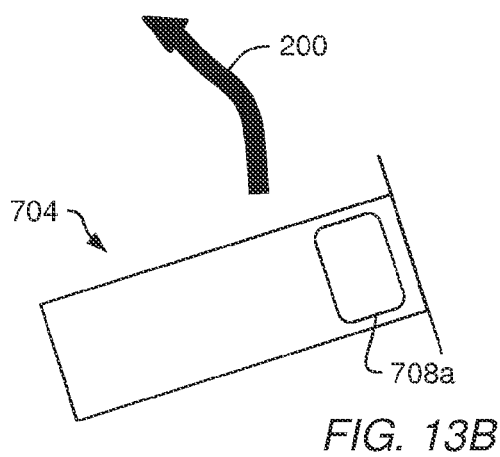
Figure 13C:
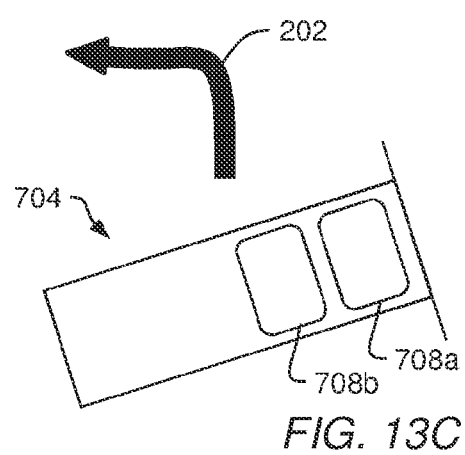
Figure 13D:
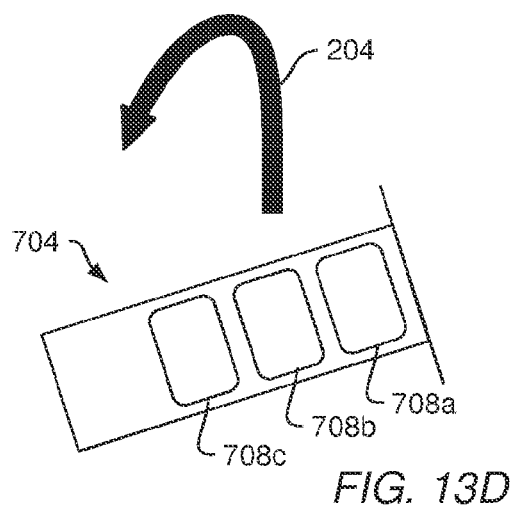
Figure 13E:
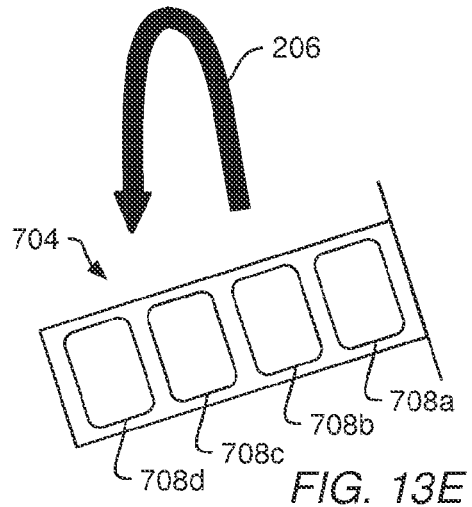

Embodiments of a haptic communication system can communicate information about an aircraft's flight path via the yoke 650. For example, referring to FIGS. 11A-11C and FIGS. 12A-12C, embodiments of the system can communicate an aircraft's position relative to an instrument landing system (ILS) glide slope to the pilot of the aircraft. In limited visibility situations, a pilot can land an aircraft on a runway by using instruments that indicate the location of a glide slope for the runway. The glide slope is an imaginary line in the air that descends toward and terminates at the landing zone of the runway. By following the glide slope using instruments in limited-visibility situations, a pilot can safely arrive at the runway. FIGS. 12A-12C illustrate different views of an ILS indicator 700 that is commonly found in aircraft cockpits. The ILS indicator 700 includes a center point 710 with a horizontal axis 706 and a vertical axis 708 extending therefrom. The ILS indicator 700 also includes a first needle 702 that indicates a vertical deviation from a glide slope and a second needle 704 that indicates a horizontal deviation from the glide slope. As shown in FIG. 12C, when both of the needles 702 and 704 cross the center point 710, the aircraft is on the glide slope. As indicated in FIG. 12B, the aircraft is oriented on the glide slope horizontally (as indicated by the second needle 704 crossing the center point 710), but the aircraft is too low (as indicated by the first needle 702 being above the center point 710). Thus, the ILS indicator 700 is telling the pilot that the aircraft needs to be higher to be on the glide slope. As indicated in FIG. 12A, the aircraft is below the glide slope (as indicated by the first needle 702 being above the center point 710) and to the left of the glide slope (as indicated by the second needle 704 being to the right of the center point 710). Thus, the ILS indicator 700 is telling the pilot that the aircraft needs to be higher and further to the right to be on the glide slope.

Embodiments of the communication system can communicate information about the position of an aircraft relative to a glide slope. Referring again to FIGS. 11A-11C, the left-side handle 654*a* can include actuators that, when actuated, cause a bulge 658 to form in the handle 654*a*. The left-side handle 654 can also include a center-indicating feature, such as a raised ridge 656, that the pilot can physically feel. Referring to FIGS. 11A and 12A, if the aircraft is low and to the left of the glide slope, the system can produce a bulge 658 in the handle 654*a* that is above the raised ridge 656 and to the right side of the handle 654*a*. The pilot can feel the bulge above the raised ridge 656 and biased to the right side of the handle 654*a*, which tells the pilot that he needs to be higher and further to the right. Referring to FIGS. 11B and 12B, if the pilot has adjusted the position of the aircraft to be laterally aligned with the glide slope but is still below the glide slope, the system can produce a bulge 658 that is equal on the left side and the right side of the handle 654*a* and that is above the raised ridge 656. The pilot can feel that the bulge is still above the raised ridge 656 but that the bulge is now equal on the left and right sides of the handle 654*a*. Thus, the pilot knows that he is still needs to be higher, but he is laterally aligned with the glide slope. Referring now to FIGS. 11C and 12C, if the pilot has now adjusted the position of the aircraft such that it is aligned with the glide slope, then the system can produce a bulge 658 that is equal on the left side and the right side of the handle 654*a* and that is also aligned with the raised ridge 658. The pilot can feel that the bulge is equal left to right and also aligned with the raised ridge 656, thereby knowing that the aircraft is aligned with the glide slope. As the aircraft moves closer to or further away from the glide slope, the bulge 658 can move relative to the handle 654*a* to indicate the changing position.

Various embodiments of the communication system in an aircraft can also be used in other phases of flight. For example, during takeoff from a runway, a pilot may need to know certain airspeeds, such as V1 (speed at which it is safer to continue takeoff if an engine fails), Vr (speed at which the aircraft's nose will raise up), and V2 (speed at which the aircraft will safely take off with an inoperative engine). In a takeoff speed mode, embodiments of the system may communicate these speeds to the pilot through the yoke 650. For example, upon reaching V1, the system may form a bulge 658 below the raised ridge 656 on the handle 654*a*. As the aircraft approaches Vr, the system may move the bulge 658 to be aligned with the raised ridge 656. Then, as the aircraft approaches V2, the system may move the bulge 658 above the raised ridge 656.

As another example, embodiments of the system can communicate information about an aircraft's angle of attack (e.g., an angle between the direction of travel of an aircraft and the angle of the wing) to a pilot. Generally, aircraft can safely operate up to a certain angle of attack. Beyond the safe angle of attack, the aircraft will stall. In an angle-of-attack mode, the system can provide a bulge 658 at the bottom of the handle 654*a* that indicates zero angle of attack. As the angle of attack of the aircraft increases, the bulge 658 can move toward the top of the handle 654. A bulge at the top of the handle 654*a* can indicate that the aircraft has exceeded the safe angle of attack.

Embodiments of a communication system in an aircraft are not limited to flight yokes. For example, embodiments of the communication system can be incorporated into center sticks, side sticks, or cyclics designed for operation with a single hand. Embodiments of the communication system can also be incorporated into a throttle, power lever, or collective control of an aircraft.

Embodiments of the system can also be incorporated onto bicycles, motorcycles, snow mobiles, all-terrain vehicles (ATVs), jet skis, and any other vehicles equipped with handlebars. Referring to FIGS. 13A-13E, embodiments of a haptic communication system are shown in a motorcycle 700. The motorcycle 700 includes a handlebar 702 with a left handle 704 and a right handle 706. Each handle can include a plurality of actuators therein that can locally deform an outer circumference of the handle. In certain embodiments, all actuators in a handle can actuate together to indicate a turn. For example, to communicate a left-hand turn, actuators in handle 704 can actuate to deform the handle 704 to deformed shape 704' shown in FIG. 13A. Similarly, to communicate a right-hand turn, actuators in handle 706 can actuate to deform the handle 706 to deformed shape 706'. In various embodiments, severity of a turn can be indicated by varying the degree to which the actuators are actuated (e.g., similarly to FIGS. 4A-4D and FIG. 6C, discussed above). Furthermore, in various embodiments, proximity to a turn can be indicated by cycling the actuators at different rates (e.g., similarly to FIGS. 5A-5D, 6B, and 6D, discussed above).

In various embodiments, turn severity can be communicated to a motorcycle rider by actuating different numbers of actuators. For example, referring to FIG. 13B, a gentle left-hand turn 200 can be communicated by actuating a single actuator 708a on the left handle 704. A ninety degree left-hand turn 202 can be communicated by actuating two actuators 708a and 708b on the left handle 704. A severe left-hand turn 206 can be communicated by actuating three actuators 708a, 708b, and 708c on the left handle 704. A left-hand u-turn can be communicated by actuating four actuators 708a, 708b, 708c, and 708d on the left handle 704. Furthermore, in various embodiments, proximity to a turn can be indicated by cycling the actuators 708a, 708b, 708c, and 708d at different rates (e.g., similarly to FIGS. 5A-5D, 6B, and 6D, discussed above). Right-hand turns can be communicated in a similar manner using actuators in the right handle 706.

In the various embodiments described above, information can be communicated to vehicle operators in different ways. For example, turn severity can be communicated by varying the number of actuators that are actuated, varying the degree to which actuators are actuated, or by cycling actuators at different rates. Similarly, turn proximity can also be communicated by varying the number of actuators that are actuated, varying the degree to which actuators are actuated, or by cycling actuators at different rates. Similarly, the system can operate in multiple modes. For example, the system in a car can include an off mode, an assist mode, and a navigation mode. Similarly, as described above, the system in an aircraft can include an ILS mode, a takeoff speed mode, and an angle of attack mode. Embodiments of the communication system, such as system 100, can include a user interface that enables a vehicle operator to select a mode of operation. The user interface can also enable the vehicle operator to select a communication "language." For example, a first driver can set the system to communicate turn severity by actuating different numbers of actuators and turn proximity by cycling actuators at different rates. A second driver can set the system to communicate turn severity by cycling actuators at different rates and turn proximity by varying the degree to which actuators are actuated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium, for example, that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for communicating steering inputs, the system comprising:
   a plurality of actuators arranged relative to a steering mechanism for a vehicle;
   at least one sensor configured to detect a position of at least one hand of the vehicle operator on the steering mechanism;
   a controller configured to send actuation signals to the plurality of actuators, wherein, in response to receiving an indication of a required steering input, the controller communicates a first aspect of the required steering input to the operator by actuating, by at least a first distance, at least one of the plurality of actuators that is at least partially positioned beneath the detected hand position, wherein the first distance indicates a severity associated with a first upcoming turn.

2. The system of claim 1, wherein the system further comprises a global positioning system (GPS) in communication with the controller, wherein the GPS provides an indication of the first upcoming turn to the controller along a route, and wherein, in response to receiving the indication of the first upcoming turn, the controller communicates the first aspect of the required steering input to the operator.

3. The system of claim 2, wherein a second aspect of the first upcoming turn comprises a proximity of the first upcoming turn, and wherein the controller communicates the proximity of the first upcoming turn by actuating the at least one of the plurality of actuators that is at least partially positioned beneath the detected position of the operator's hand in a cycling manner at a first frequency to communicate that the first upcoming turn is a first distance away and at a second frequency to communicate that the first upcoming turn is a second distance away.

4. The system of claim 2, wherein at least one aspect of a second upcoming turn comprises a proximity of the second upcoming turn, and wherein the controller communicates the proximity of the second upcoming turn by actuating, by at least a second distance distance, a first actuator of the at least one of the plurality of actuators to communicate that the second upcoming turn is a first distance away and by actuating, by a third distance that is greater than the second distance, at least one of the first actuator and a second actuator of the at least one of the plurality of actuators to communicate that the second upcoming turn is a second distance away.

5. The system of claim 2, wherein a second aspect of the first upcoming turn comprises a direction of the first upcoming turn, and wherein, upon detecting two hands on the steering mechanism, the controller communicates the direction of the first upcoming turn by actuating, by at least the first distance, at least one actuator at least partially positioned under the hand corresponding to the direction of the first upcoming turn.

6. The system of claim 2, wherein a second aspect of the first upcoming turn comprises a direction of the first upcoming turn, and wherein, upon detecting only one hand on the wheel, the controller communicates the direction of the first upcoming turn by actuating, by at least the first distance, at least one actuator at least partially positioned under the side of the hand that corresponds to the direction of the first upcoming turn.

7. The system of claim 2:
   wherein a second aspect of the first upcoming turn comprises a direction of the first upcoming turn and a third aspect of the first upcoming turn comprises a proximity of the first upcoming turn,
   wherein, upon detecting two hand positions on the steering mechanism, the controller communicates the direction of the first upcoming turn by actuating at least one actuator at least partially positioned under the detected hand position corresponding to the direction of the first upcoming turn, and
   wherein the controller communicates the proximity of the first upcoming turn by actuating the at least one actuator in a cycling manner at a first frequency to communicate that the first upcoming turn is a first distance away and at a second frequency to communicate that the first upcoming turn is a second distance away.

8. The system of claim 1, wherein, in response to receiving a second indication of second required steering input, the controller actuates, by at least a second distance, at least one of the plurality of actuators that is at least partially positioned beneath a second detected hand position, wherein the second distance indicates a severity associated with a second upcoming turn that is greater than the severity associated with the first upcoming turn, and the second distance is greater than the first distance.

9. The system of claim 1, wherein, in response to receiving an indication of a required steering input, the controller communicates a second aspect of the required steering input to the operator by actuating, with at least a first pulse frequency, at least one of the plurality of actuators that is positioned beneath the detected hand position to indicate a proximity assocated with the upcoming turn.

10. A controller, comprising:
  a first signal input for receiving one or more navigation signals associated with a vehicle;
  a second signal input for receiving one or more hand position signals;
  a signal output; and
  a processor configured to:
    based on the one or more hand position signals, detect a position of a hand of an operator of the vehicle on a steering mechanism of the vehicle;
    based on the one or more navigation signals, determine a steering input to be applied to the steering mechanism to effect a navigational operation of the vehicle; and
    output a control signal to the signal output, the control signal configured to deform, by a first amount, the steering mechanism at the detected hand position in a manner that communicates a first aspect of the required steering input to the vehicle operator, wherein the first amount indicates a severity associated with an approaching turn.

11. The controller of claim 10, wherein the processor is configured to determine the steering input to be applied to the steering mechanism by monitoring the position of the vehicle along a predetermined travel route and determining that the vehicle is approaching a turn in the route, and, in response, the control signal is configured to deform the steering mechanism by the first amount.

12. The controller of claim 11, wherein a second aspect of the approaching turn comprises a proximity of the approaching turn, and wherein the control signal is configured to deform the steering mechanism at the detected hand position in a cycling manner at a first frequency to communicate that the approaching turn is a first distance away and at a second frequency to communicate that the approaching turn is a second distance away.

13. The controller of claim 11, wherein a second aspect of the approaching turn comprises a proximity of the approaching turn, and wherein the control signal is configured to deform a first length of the steering mechanism at the detected hand position to communicate that the approaching turn is a first distance away and deforming a second length of the steering mechanism at the detected hand position to communicate that the approaching turn is a second distance away.

14. The controller of claim 11, wherein a second aspect of the approaching turn comprises a direction of the approaching turn, wherein the processor is configured to detect two hand positions upon receiving two hand position signals, and wherein the control signal is configured to deform a portion of the steering mechanism at the one detected hand position corresponding to the direction of the approaching turn.

15. The controller of claim 11, wherein a second aspect of the approaching turn comprises a direction of the approaching turn, wherein the processor is configured to detect one hand position upon receiving one hand position signal, and wherein the control signal is configured to deform the steering mechanism at a portion of the detected hand position corresponding to the direction of the approaching turn.

16. The controller of claim 11:
  wherein a second aspect of the approaching turn comprises a direction of the approaching turn and a third aspect of the approaching turn comprises a proximity of the approaching turn,
  wherein the processor is configured to detect two hand positions upon receiving two hand position signals, and wherein the control signal is configured to deform the the steering mechanism at the detected hand position corresponding to the direction of the approaching turn, and
  wherein the control signal is further configured to deform the the steering mechanism at the detected hand position corresponding to the direction of the approaching turn in a cycling manner at a first frequency to communicate that the approaching turn is a first distance away and at a second frequency to communicate that the approaching turn is a second distance away.

17. A navigation communication system for use in a vehicle, the navigation system comprising:
  a processor;
  a navigation module configured to output one or more navigation signals;
  a plurality of actuators arranged relative to a steering mechanism of the vehicle;
  at least one sensor configured to detect a hand position of at least one hand of a vehicle operator on the steering mechanism;
  a controller configured to actuate, by at least a first distance, each of the plurality of actuators; and
  a memory storing instructions that, when executed by the processor, configure the processor to:
    determine, from the one or more navigation signals, a required steering input to the steering mechanism; and
    cause the controller to actuate, by at least a first distance, actuators on the steering mechanism at the detected hand position in a manner that communicates a first aspect of the required steering input to the operator, wherein the first distance indicates a severity associated with a first upcoming turn.

18. The system of claim 17, wherein the memory stores a travel route of the vehicle that comprises a turn, wherein the navigation module comprises a global positioning system (GPS) module in communication with the processor, wherein the GPS module determines a required steering input related to the first upcoming turn, and, in response, the controller communicates the first aspect of the first upcoming turn to the operator.

* * * * *